US012650393B2

(12) United States Patent
Loberg et al.

(10) Patent No.: US 12,650,393 B2
(45) Date of Patent: Jun. 9, 2026

(54) MATERIAL WEIGHTING OF PROJECTION BASED SPECTRAL X-RAY IMAGING

(71) Applicant: GE Precision Healthcare LLC, Waukesha, WI (US)

(72) Inventors: Johannes Loberg, Stockholm (SE); Martin Sjölin, Stockholm (SE); Mats Persson, Västerhaninge (SE); Fredrik Grönberg, Stockholm (SE); Björn Cederström, Stockholm (SE); Daniel Collin, Stockholm (SE)

(73) Assignee: GE Precision Healthcare LLC, Waukesha, WI (US)

( * ) Notice: Subject to any disclaimer, the term of this patent is extended or adjusted under 35 U.S.C. 154(b) by 386 days.

(21) Appl. No.: 18/516,248

(22) Filed: Nov. 21, 2023

(65) Prior Publication Data

US 2025/0164416 A1     May 22, 2025

(51) Int. Cl.
*G01N 23/046*      (2018.01)
*G06T 12/20*      (2026.01)

(52) U.S. Cl.
CPC ........... *G01N 23/046* (2013.01); *G06T 12/20* (2026.01); *G01N 2223/1016* (2013.01); *G01N 2223/401* (2013.01); *G01N 2223/419* (2013.01); *G06T 2211/441* (2023.08)

(58) Field of Classification Search
CPC ......... G01N 23/046; G01N 2223/1016; G01N 2223/401; G01N 2223/419; G06T 12/20; G06T 2211/441; G06T 2211/408; G06T 11/005; G06T 11/003; A61B 6/032; A61B 6/482; A61B 6/5205; A61B 6/40; A61B 6/4021; A61B 6/4208; A61B 6/4241; A61B 6/4452; A61B 6/5211; A61B 6/5217; G06F 17/12
See application file for complete search history.

(56) References Cited

U.S. PATENT DOCUMENTS

| | | | |
|---|---|---|---|
| 9,870,628 B2 | 1/2018 | Gronberg | |
| 2011/0052022 A1* | 3/2011 | Xu | ......................... G06T 11/005 |
| | | | 378/4 |
| 2022/0270251 A1 | 8/2022 | Schmidt | |
| 2023/0309937 A1 | 10/2023 | Sossin | |

OTHER PUBLICATIONS

Andriiashen et al., "Development of the Projection-Based Material Decomposition Algorithm for Multi-Energy CT", IEEE Transactions on Radiation and Plasma Medical Sciences, Sep. 2020, 11 pages.
Yveborg et al., "Optimal Frequency-Based Weighting for Spectral X-Ray Projection Imaging", IEEE Transactions on Medical Imaging, Sep. 2014, 10 pages.

(Continued)

*Primary Examiner* — Courtney D Thomas

(57) ABSTRACT

A system and method for projection based spectral X-ray imaging, such as computed tomography (CT) imaging, the system and method comprising performing projection based material decomposition based on spectral X-ray data to generate a set of material basis sinograms, and performing a weighted combination of at least part of at least two material basis sinograms of the set of material basis sinograms into a reconstructed image based on material weighting in the projection domain.

21 Claims, 16 Drawing Sheets

(56) References Cited

OTHER PUBLICATIONS

Carsten O Schirra et al: "Statistical Reconstruction of Material Decomposed Data in Spectral CT", IEEE Transactions on Medical Imaging, IEEE, USA, vol. 32, No. 7, Jul. 1, 2013 (Jul. 1, 2013), pp. 1249-1257, XP011516353, ISSN: 0278-0062, DOI:10.1109/TMI.2013.2250991.

EP application 24210302.6 filed Oct. 31, 2024—extended Search Report issued Apr. 4, 2025; 9 pages.

Mats Danielsson et al: "Photon-counting x-ray detectors for CT", Physics in Medicine and Biology, Institute of Physics Publishing, Bristol GB, vol. 66, No. 3, XP020359782, ISSN: 0031-9155, DOI: 10.1088/1361-6560/ABC5A5.

Taly Gilat Schmidt et al: "The effects of extending the spectral information acquired by a photon-counting detector for spectral CT", Physics in Medicine and Biology, Institute of Physics Publishing, Bristol GB, vol. 60, No. 4, pp. 1583-1600, XP020278936, ISSN: 0031-9155, DOI: 10.1088/0031-9155/60/4/1583.

* cited by examiner

X-ray Detector

X-ray Source

100

20

30

Object

10

Image Processing
System

X-ray Detector
Elements

21

26

25

40

50

Analog
Processing
Circuitry

Digital
Processing
Circuitry

Image
Processing
Circuitry

Image

Memory

45

30

SPECTRAL X-RAY DATA

PERFORMING PROJECTION BASED MATERIAL DECOMPOSITION   S1

PERFORMING WEIGHTED COMBINATION   S2

RECONSTRUCTED IMAGE

MATERIAL WEIGHTING OF PROJECTION BASED SPECTRAL X-RAY IMAGING

BACKGROUND

The proposed technology relates to X-ray technology and X-ray imaging, and more particularly to reconstructing projection images. In particular, the proposed technology relates to an X-ray imaging system such as a computed tomography (CT) imaging system configured for reconstruction of a projection image using projection based spectral X-ray imaging, as well as a corresponding computer program product, for improved image quality.

Radiographic imaging such as CT imaging systems and other more general X-ray imaging systems have been used for years in medical applications, such as for medical diagnostics and treatment.

A typical X-ray imaging system such as a CT imaging system includes an X-ray source, an X-ray detector, and an associated image processing system. The X-ray detector includes multiple detector modules comprising one or many detector elements, for independent measuring of X-ray intensities. The X-ray source emits X-rays, which pass through a subject or object being imaged and received by the X-ray detector. The X-ray source and X-ray detector are typically arranged to rotate on a rotating member of a gantry, around the subject or object. The emitted X-rays are attenuated by the subject or object as they pass through, and the resulting transmitted X-rays are measured by the X-ray detector. The X-ray detector is coupled to a digital acquisition system (DAS) and the measured X-ray data is transferred to the image processing system to reconstruct images of the subject or object.

It may be useful with a brief overview of an illustrative general X-ray imaging system according to the prior art with reference to FIG. 1A. In this illustrative example the X-ray imaging system 100 comprises an X-ray source 10, an X-ray detector 20 and an associated image processing system 30. In general, the X-ray detector 20 is configured to register radiation from the X-ray source 10, which optionally has been focused by optional X-ray optics or collimators and passed through an object, a subject or a part thereof. The X-ray detector 20 is connectable to the image processing system 30 via suitable read-out electronics, which is at least partly integrated in the X-ray detector 20, to enable image processing and/or image reconstruction by the image processing system 30.

By way of example, a conventional CT imaging system includes an X-ray source and an X-ray detector arranged in such a way that projection images of the subject or object can be acquired in different viewing angles covering at least 180 degrees. This is most commonly achieved by mounting the source and detector on a support, e.g., a rotating member of a gantry, that is able to rotate around the subject or object. An image containing the projections registered in the different detector elements for the different view angles is called a sinogram. In the following, a collection of projections registered in the different detector elements for different view angles will be referred to as a sinogram even if the detector is two-dimensional (2D), making the sinogram a three-dimensional (3D) image.

FIG. 1B is a schematic diagram illustrating an example of an X-ray imaging system setup according to the prior art, showing projection lines from an X-ray source through an object to an X-ray detector.

A further development of X-ray imaging is energy-resolved X-ray imaging, also known as spectral X-ray imaging, where the X-ray transmission is measured for several different energy levels. This can be achieved by letting the source switch rapidly between two different emission spectra, by using two or more X-ray sources emitting different X-ray spectra, or by using an energy-discriminating detector which measures the incoming radiation in two or more energy levels. An example of such a detector is a multi-bin photon counting detector, where each registered photon generates a current pulse which is compared to a set of thresholds, thereby counting the number of photons incident in each of a number of energy bins.

A spectral X-ray projection measurement results in a projection image for each energy level. A weighted sum of these projection images can be made to optimize the contrast-to-noise ratio (CNR) for a specified imaging task as described in "SNR and DQE analysis of broad spectrum X-ray imaging", Tapiovaara and Wagner, Phys. Med. Biol. 30, 519.

Another technique enabled by energy-resolved X-ray imaging is basis material decomposition. This technique utilizes the fact that all substances built up from elements with low atomic number, such as human tissue, have linear attenuation coefficients whose energy dependence can be expressed, to a good approximation, as a linear combination of two (or more) basis functions:

$$\mu(E) = a_1 f_1(E) + a_2 f_2(E)$$

where $f_1$ and $f_2$ are basis functions and $a_1$ and $a_2$ are the corresponding basis coefficients. More, generally, $f_i$ are basis functions and $a_i$ are corresponding basis coefficients, where $i=1, \ldots, N$ where N is the total number of basis functions. If there is one or more element in the imaged volume with high atomic number, high enough for a K-absorption edge to be present in the energy range used for the imaging, one basis function must be added for each such element. In the field of medical imaging, such K-edge elements can typically be iodine or gadolinium, substances that are used as contrast agents.

Basis material decomposition has been described in "Energy-selective reconstructions in X-ray computerized tomography", Alvarez, Macovski, Phys Med Biol. 1976; 21 (5): 733-744. In basis material decomposition, the integral of each of the basis coefficients, $A_i = \int_\ell a_i dl$ for $i=1, \ldots, N$ where N is the number of basis functions, is inferred from the measured data in each projection ray $\ell$ from the source to a detector element. In one implementation, this is accomplished by first expressing the expected registered number of counts in each energy bin as a function of $A_i$:

$$\lambda_i = \int_{E=0}^{\infty} S_i(E) \exp\left(-\sum_{j=1}^{N} A_j f_j(E)\right) dE$$

where $\lambda_i$ is the expected number of counts in energy bin i, E is the energy, $S_i$ is a response function which depends on the spectrum shape incident on the imaged object, the quantum efficiency of the detector and the sensitivity of energy bin i to X-rays with energy E. Even though the term energy bin is most commonly used for photon counting detectors, this formula can also describe other energy resolving X-ray imaging systems such as multi-layer detectors, kVp switching sources or multiple source systems.

Then, the maximum likelihood method may be used to estimate $A_i$, under the assumption that the number of counts in each bin is a Poisson distributed random variable. This is accomplished by minimizing the negative log-likelihood function, e.g., see "K-edge imaging in X-ray computed tomography using multi-bin photon counting detectors", Roessl and Proksa, Phys. Med. Biol. 52 (2007), 4679-4696:

$$\hat{A}_1, \dots, \hat{A}_N = \underset{A_1, \dots, A_N}{\operatorname{argmin}} \sum_{i=1}^{M_b} \lambda_i(A_1, \dots, A_N) - m_i \ln \lambda_i(A_1, \dots, A_N)$$

where $m_i$ is the number of measured counts in energy bin i and $M_b$ is the number of energy bins.

When the resulting estimated basis coefficient line integral $\hat{A}_i$ for each projection line is arranged into an image matrix, the result is a material specific projection image, also called a basis image, for each basis i. This basis image can either be viewed directly (e.g., in projection X-ray imaging) or taken as input to a reconstruction algorithm to form maps of basis coefficients $a_i$ inside the object (e.g., in CT imaging). In either case, the result of a basis decomposition can be regarded as one or more basis image representations, such as the basis coefficient line integrals or the basis coefficients themselves.

Image quality improvement for X-ray imaging systems is undoubtedly a critical area to ensure quality and safety in patient care, and is associated with various approaches, not to mention within the field of spectral X-ray imaging.

Therefore, there is still a general demand for improvements of image quality in terms of reduced noise, increased contrast to noise ratio (CNR), improved patient does efficiency, etc.

SUMMARY

This summary introduces concepts that are described in more detail in the detailed description. It should not be used to identify essential features of the claimed subject matter, nor to limit the scope of the claimed subject matter.

According to an aspect, there is provided a method for projection based spectral X-ray imaging. The method comprises performing projection based material decomposition based on spectral X-ray data to generate a set of material basis sinograms, and performing a weighted combination of at least part of at least two material basis sinograms of the set of material basis sinograms into a reconstructed image based on material weighting in the projection domain.

According to another aspect, there is provided a CT imaging system comprising an X-ray source configured to emit X-rays, an X-ray detector configured to generate spectral X-ray data, and a processor. The processor is configured to perform projection based material decomposition on the spectral X-ray data to generate a set of material basis sinograms. The processor is further configured to perform a weighted combination of at least part of at least two material basis sinograms of the set of material basis sinograms into a reconstructed image based on material weighting in the projection domain.

The proposed technology enables an approach of reconstructing an image for projection based spectral X-ray imaging. Reconstructing the image is based on adaptive/dynamic material weighting in the projection domain, i.e., reconstructed from the set of material basis sinograms. The proposed technology allows for an improved mapping of material basis sinograms, thus resulting in an improved quality of the reconstructed image. It is to be understood that the X-ray imaging may be CT imaging and the reconstructed image may be a reconstructed CT image. The improved quality can for example be associated with increased CNR, reduced noise, and/or accentuate certain features in the image, such as anatomical features. In addition, the proposed technology enables an increased patient dose efficiency, without suffering intolerable loss in image quality. Furthermore, the proposed technology requires no additional calibrations during use, thus further facilitating the implementation of the technology. It should also be noted that the proposed technology may be suitable for all photon counting X-ray detectors, and other dual source systems, for example X-ray and mammography systems.

BRIEF DESCRIPTION OF DRAWINGS

Various aspects of this disclosure may be better understood upon reference to the accompanying drawings and reading the detailed description.

DETAILED DESCRIPTION

Embodiments of the present disclosure will now be described, by way of example, with reference to the figures.

For a better understanding, it may be useful to continue with an introductory description of non-limiting examples of an overall X-ray imaging system in which data processing and transferring according to the inventive concept may be implemented.

Figure 2:
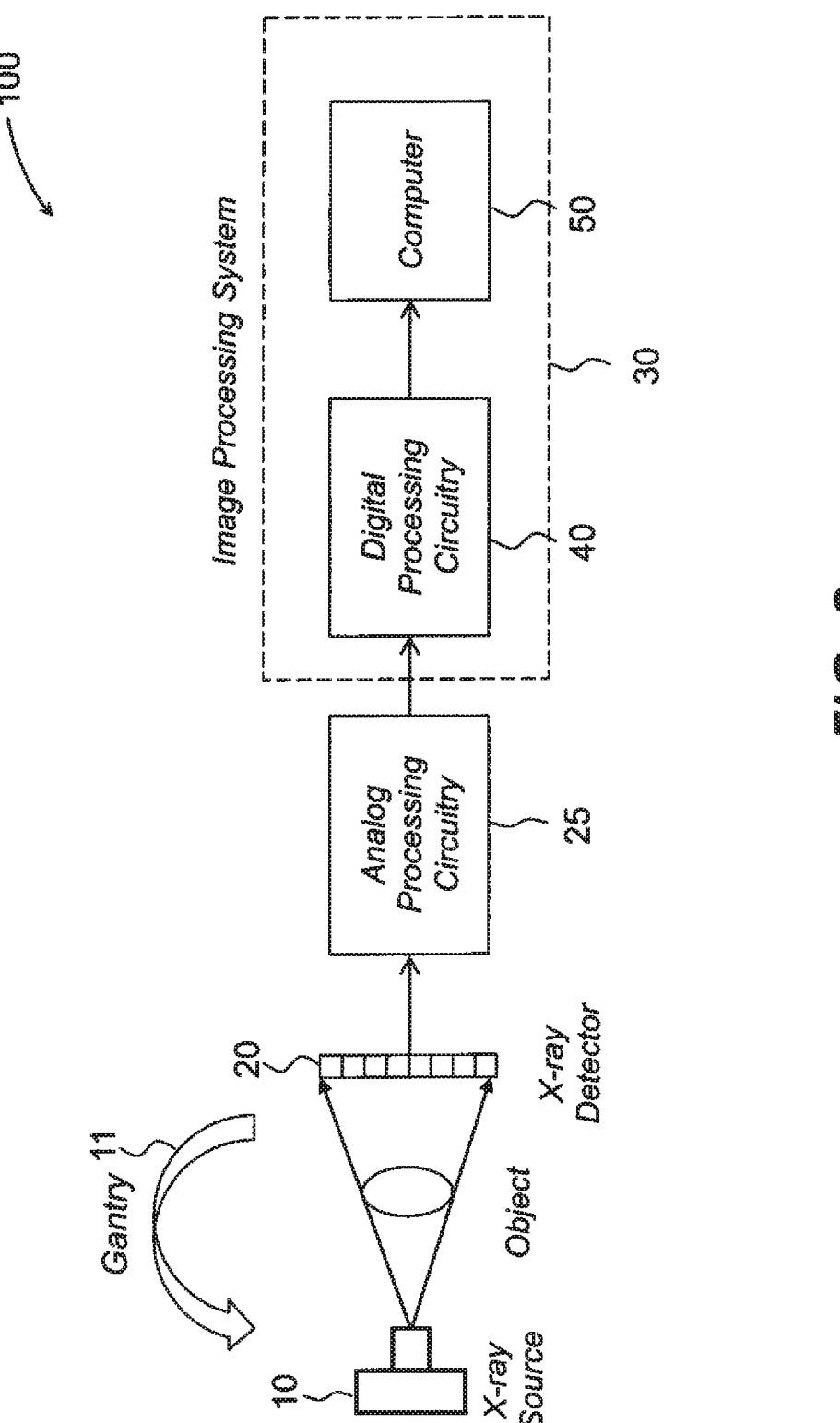
FIG. 2 is a schematic diagram illustrating another example of an X-ray imaging system, such as a CT imaging system.

FIG. 2 is a schematic diagram illustrating an example of an X-ray imaging system 100, such as a CT imaging system, comprising an X-ray source 10, which emits X-rays, an X-ray detector 20 with an X-ray detector, which detects X-rays after they have passed through the object, analog processing circuitry 25, which processes the raw electrical signals from the X-ray detector and digitizes it, digital processing circuitry 40, which may carry out further processing operations on the measured data, such as applying corrections, storing it temporarily, or filtering, and a computer 50, which stores the processed data and may perform further post-processing and/or image reconstruction. The digital processing circuitry 40 may comprise a digital processor. According to an exemplary embodiment, all or part of the analog processing circuitry 25 may be implemented in the X-ray detector 20. The X-ray source and X-ray detector may be coupled to a rotating member of a gantry 11 of the CT imaging system 100.

The overall X-ray detector may be regarded as the X-ray detector system 20, or the X-ray detector 20 combined with the associated analog processing circuitry 25.

In communication with and electrically coupled to the analog processing circuitry 25 is an image processing system 30, which may include digital processing circuitry 40 and/or a computer 50, which may be configured to perform image reconstruction based on the image data from the X-ray detector. The image processing system 30 may, thus, be seen as the computer 50, or alternatively the combined system of the digital processing circuitry 40 and the computer 50, or possibly the digital processing circuitry 40 by itself if the digital processing circuitry is further specialized also for image processing and/or reconstruction.

An example of a commonly used X-ray imaging system is a CT imaging system, which may include an X-ray source or X-ray tube that produces a fan beam or cone beam of X-rays and an opposing array of X-ray detectors measuring the fraction of X-rays that are transmitted through a patient or object. The X-ray source or X-ray tube and X-ray detector are mounted in a gantry 11 that can rotate around the imaged object.

Figure 3:
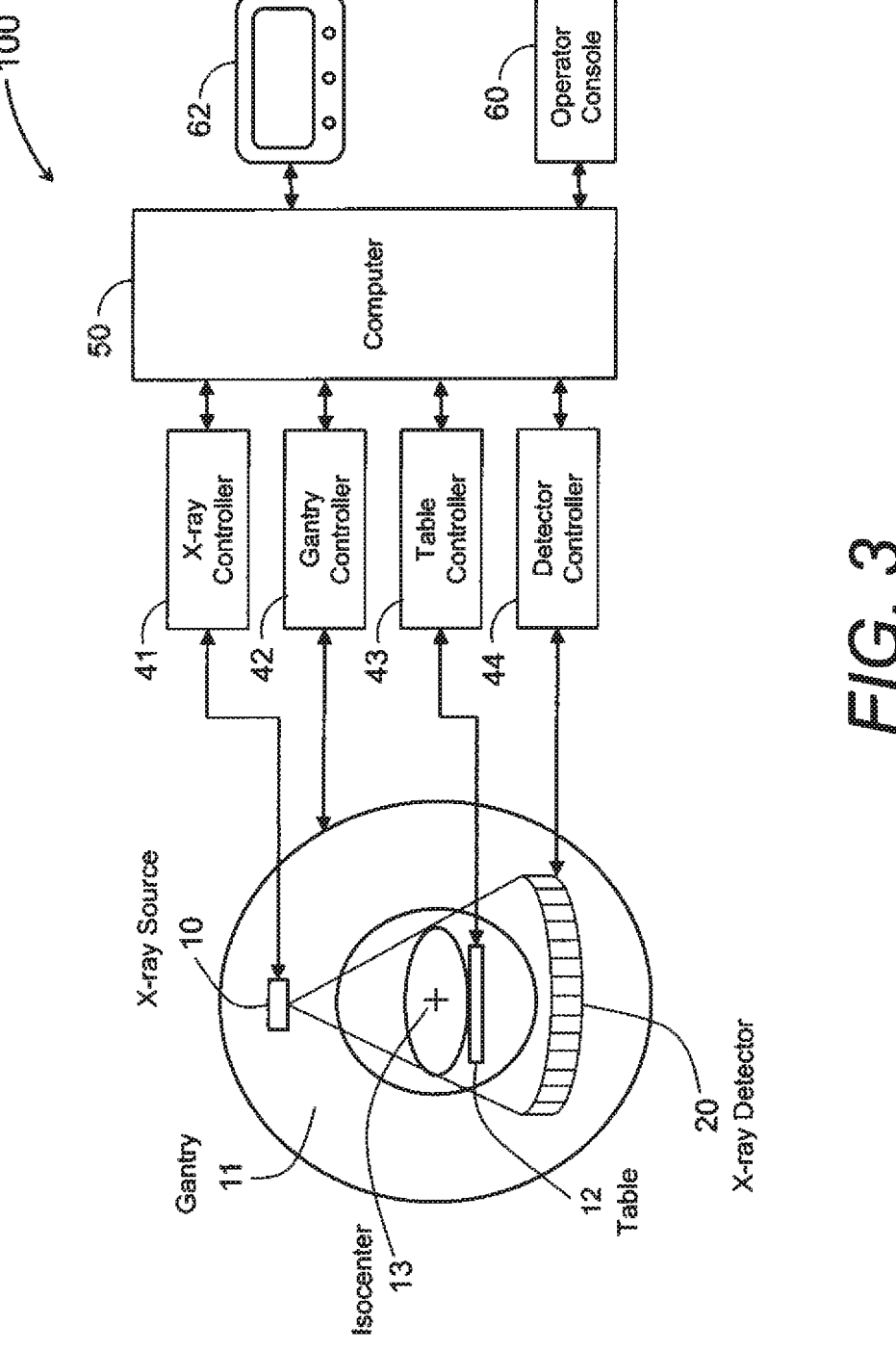
FIG. 3 is a schematic block diagram of a CT imaging system as an illustrative example of an X-ray imaging system.

FIG. 3 schematically shows a CT imaging system 100 as an illustrative example of an X-ray imaging system. The CT imaging system comprises a computer 50 receiving commands and scanning parameters from an operator via an operator console 60 that may have a display 62 and some form of operator interface, e.g., a keyboard, mouse, joy stick, touch screen or other input device. The operator supplied commands and parameters are then used by the computer 50 to provide control signals to an X-ray controller 41, a gantry controller 42 and a table controller 43. To be specific, the X-ray controller 41 provides power and timing signals to the x-ray source 10 to control emission of X-rays onto the object or patient lying on the table 12. The gantry controller 42 controls the rotating speed and position of the gantry 11 comprising the X-ray source 10 and the X-ray detector 20. By way of example, the X-ray detector 20 may be a photon counting X-ray detector. The table controller 43 controls and determines the position of the patient table 12 and the scanning coverage of the patient. There is also a detector controller 44, which is configured for controlling and/or receiving data from the X-ray detector 20.

Figure 1A:
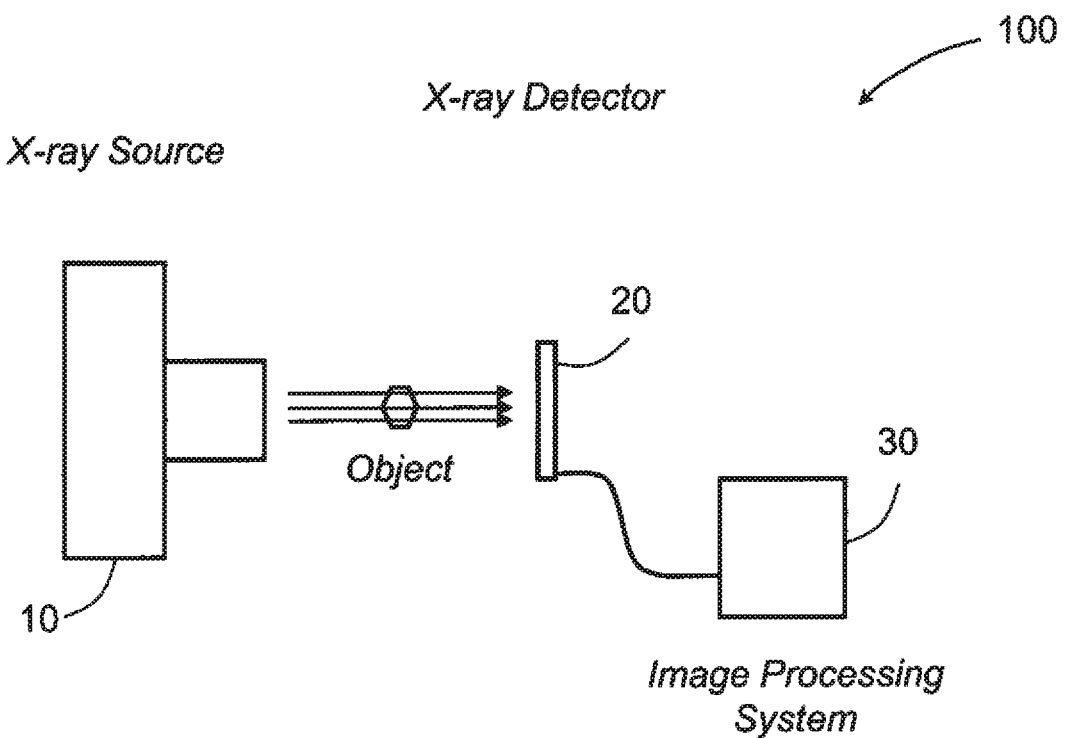
FIGS. 1A and 1B are schematic diagrams illustrating an example X-ray imaging system.
Figure 1B:
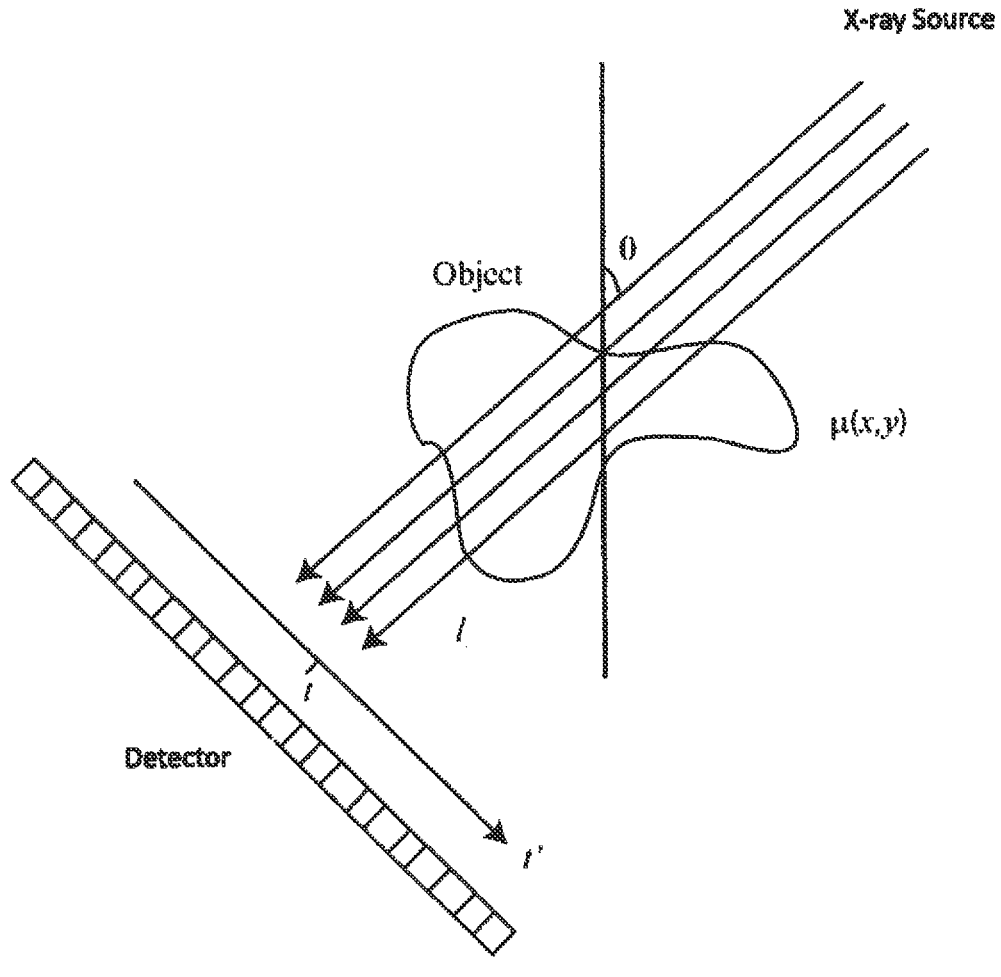

In an embodiment, the computer 50 also performs post-processing and image reconstruction of the image data output from the X-ray detector 20. The computer 50 thereby corresponds to the image processing system 30 as shown in FIGS. 1 and 2. The associated display 62 allows the operator to observe the reconstructed images and other data from the computer 50.

The X-ray source 10 arranged in the gantry 11 emits X-rays. An X-ray detector 20, which may be in the form of a photon counting X-ray detector, detects the X-rays after they have passed through the object or patient. The X-ray detector 20 may for example be formed by plurality of pixels, also referred to as sensors or detector elements, and associated image processing circuitry, such as Application Specific Integrated Circuits (ASICs), arranged in detector modules. A portion of the analog processing may be implemented in the pixels, whereas any remaining processing is implemented in, for instance, the ASICs. In an embodiment, the image processing circuitry (ASICs) digitizes the analog signals from the pixels. The image processing circuitry (ASICs) may also comprise a digital processing, which may carry out further processing operations on the measured data, such as applying corrections, storing it temporarily, and/or filtering. During a scan to acquire X-ray projection data, the gantry and the components mounted thereon rotate about an isocenter 13.

Modern X-ray detectors normally need to convert the incident X-rays into electrons, this typically takes place through the photoelectric effect or through Compton interaction and the resulting electrons are usually creating secondary visible light until its energy is lost and this light is in turn detected by a photo-sensitive material. There are also detectors, which are based on semiconductors and in this case the electrons created by the X-ray are creating electric charge in terms of electron-hole pairs which are collected through an applied electric field.

There are detectors operating in an energy integrating mode in the sense that they provide an integrated signal from a multitude of X-rays. The output signal is proportional to the total energy deposited by the detected X-rays.

X-ray detectors with photon counting and energy resolving capabilities are becoming common for medical X-ray applications. The photon counting detectors have an advantage since in principle the energy for each X-ray can be measured which yields additional information about the composition of the object. This information can be used to increase the image quality and/or to decrease the radiation dose.

Generally, a photon counting X-ray detector determines the energy of a photon by comparing the height of the electric pulse generated by a photon interaction in the detector material to a set of comparator voltages. These comparator voltages are also referred to as energy thresholds. Generally, the analog voltage in a comparator is set by a digital-to-analog converter (DAC). The DAC converts a digital setting sent by a controller to an analog voltage to which the heights of the photon pulses can be compared.

A photon counting detector counts the number of photons that have interacted in the detector during a measurement time. A new photon is generally identified by the fact that the height of the electric pulse exceeds the comparator voltage of at least one comparator. When a photon is identified, the event is stored by incrementing a digital counter associated with the channel.

When using several different threshold values, an energy-discriminating photon counting detector is obtained, in which the detected photons can be sorted into energy bins corresponding to the various threshold values. Sometimes, this type of photon counting detector is also referred to as a multi-bin detector. In general, the energy information allows for new kinds of images to be created, where new information is available and image artifacts inherent to conventional technology can be removed. In other words, for an energy-discriminating photon counting detector, the pulse heights are compared to a number N of programmable thresholds (T1-TN) in the comparators and are classified according to pulse-height, which in turn is proportional to energy. In other words, a photon counting detector comprising more than one comparator is here referred to as a multi-bin photon counting detector. In the case of multi-bin photon counting detector, the photon counts are stored in a set of counters, typically one for each energy threshold. For example, one count can be assigned to the highest energy threshold that the photon pulse has exceeded. In another example, counters keep track of the number of times that the photon pulse cross each energy threshold.

As an example, edge-on is a special, non-limiting design for a photon counting detector, where the X-ray sensors such as X-ray detector elements or pixels are oriented edge-on to incoming X-rays.

For example, such photon counting detectors may have pixels in at least two directions, wherein one of the directions of the edge-on photon counting detector has a component in the direction of the X-rays. Such an edge-on photon counting detector is sometimes referred to as a depth-segmented photon counting detector, having two or more depth segments of pixels in the direction of the incoming X-rays. It should be noted that one detector element may correspond to one pixel, and/or a plurality of detector elements corresponds to one pixel and/or the data signal from a plurality of detector elements may be used for one pixel.

Alternatively, the pixels may be arranged as an array (non-depth-segmented) in a direction substantially orthogonal to the direction of the incident X-rays, and each of the pixels may be oriented edge-on to the incident X-rays. In other words, the photon counting detector may be non-depth-segmented, while still arranged edge-on to the incoming X-rays.

By arranging the edge-on photon counting detector edge-on, the absorption efficiency can be increased, in which case the absorption depth can be chosen to any length, and the edge-on photon counting detector can still be fully depleted without going to very high voltages.

A conventional mechanism to detect X-ray photons through a direct semiconductor detector basically works as follows. The energy of the X-ray interactions in the detector material are converted to electron-hole pairs inside the semiconductor detector, where the number of electron-hole pairs is generally proportional to the photon energy. The electrons and holes are drifted towards the detector electrodes and backside (or vice versa). During this drift, the electrons and holes induce an electrical current in the electrode, a current which may be measured.

Figure 4:
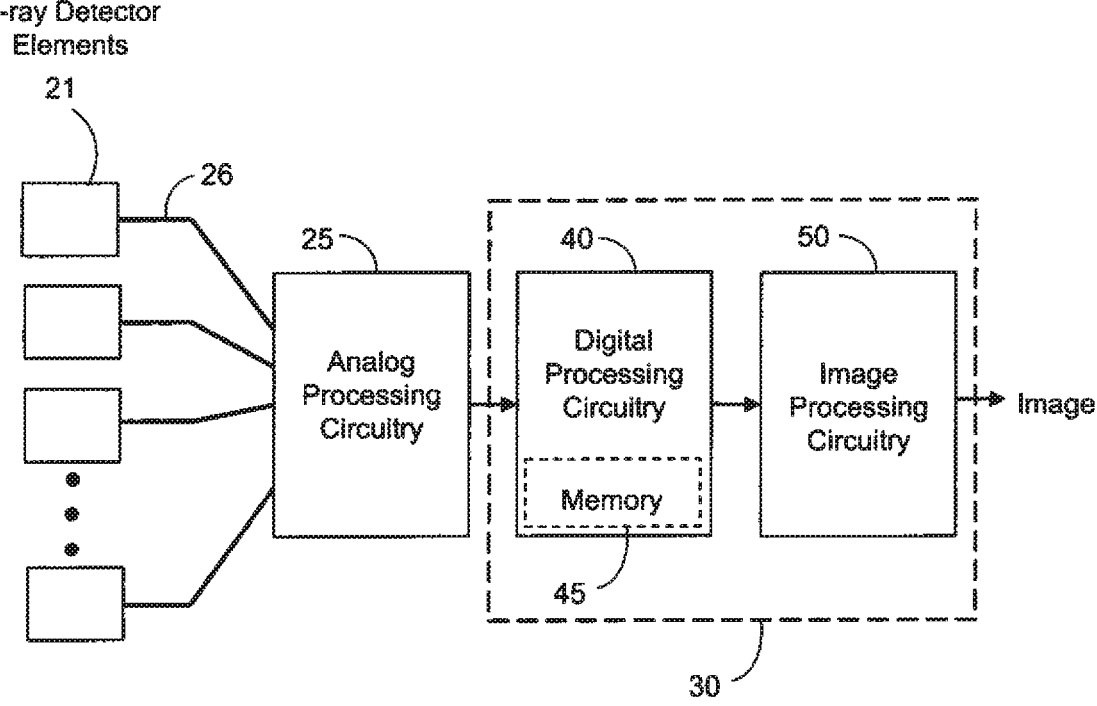
FIG. 4 is a schematic diagram illustrating another example of relevant parts of an X-ray imaging system, such as a CT imaging system.

As illustrated in FIG. 4, signal(s) is/are routed via routing paths 26 from detector elements 22 of the X-ray detector to inputs of analog processing circuitry (e.g., ASICs) 25. It should be understood that the term Application Specific Integrated Circuit (ASIC) is to be interpreted broadly as any general circuit used and configured for a specific application. The ASIC processes the electric charge generated from each X-ray and converts it to digital data, which can be used to obtain measurement data such as a photon count and/or estimated energy. The ASICs are configured for connection to digital processing circuitry so the digital data may be sent to digital processing circuitry 40 and/or one or more memory circuits or components 45 and finally the data will be the input for image processing circuitry 30 or computer 50 in FIG. 2 to generate a reconstructed image.

As the number of electrons and holes from one X-ray event is proportional to the energy of the X-ray photon, the total charge in one induced current pulse is proportional to this energy. After a filtering step in the ASIC, the pulse amplitude is proportional to the total charge in the current pulse, and therefore proportional to the X-ray energy. The pulse amplitude can then be measured by comparing its value with one or more thresholds (THR) in one or more comparators (COMP), and counters are introduced by which the number of cases when a pulse is larger than the threshold value may be recorded. In this way it is possible to count and/or record the number of X-ray photons with an energy exceeding an energy corresponding to respective threshold value (THR) which has been detected within a certain time frame.

The ASIC typically samples the analog photon pulse once every Clock Cycle and registers the output of the comparators. The comparator(s) (threshold) outputs a one or a zero depending on whether the analog signal was above or below the comparator voltage. The available information at each sample is, for example, a one or a zero for each comparator representing weather the comparator has been triggered (photon pulse was higher than the threshold) or not.

In a photon counting detector, there is typically a Photon Counting Logic which determines if a new photon has been registered and, registers the photons in counter(s). In the case of a multi-bin photon counting detector, there are typically several counters, for example one for each comparator, and the photon counts are registered in the counters in accordance with an estimate of the photon energy. The logic can be implemented in several different ways. Two of the most common categories of Photon Counting Logic are the non-paralyzable counting modes, and the paralyzable counting modes. Other photon counting logics include, for example, local maxima detection, which counts, and possibly also registers the pulse height of, detected local maxima in the voltage pulse.

There are many benefits of photon counting detectors including, but not limited to high spatial resolution; less sensitivity to electronic noise; good energy resolution; and material separation capability (spectral imaging ability). However, energy integrating detectors have the advantage of high count-rate tolerance. The count-rate tolerance comes from the fact/recognition that, since the total energy of the photons is measured, adding one additional photon will always increase the output signal (within reasonable limits), regardless of the amount of photons that are currently being registered by the detector. This advantage is one of the main reasons that energy integrating detectors are the standard for medical CT today.

Figure 5:
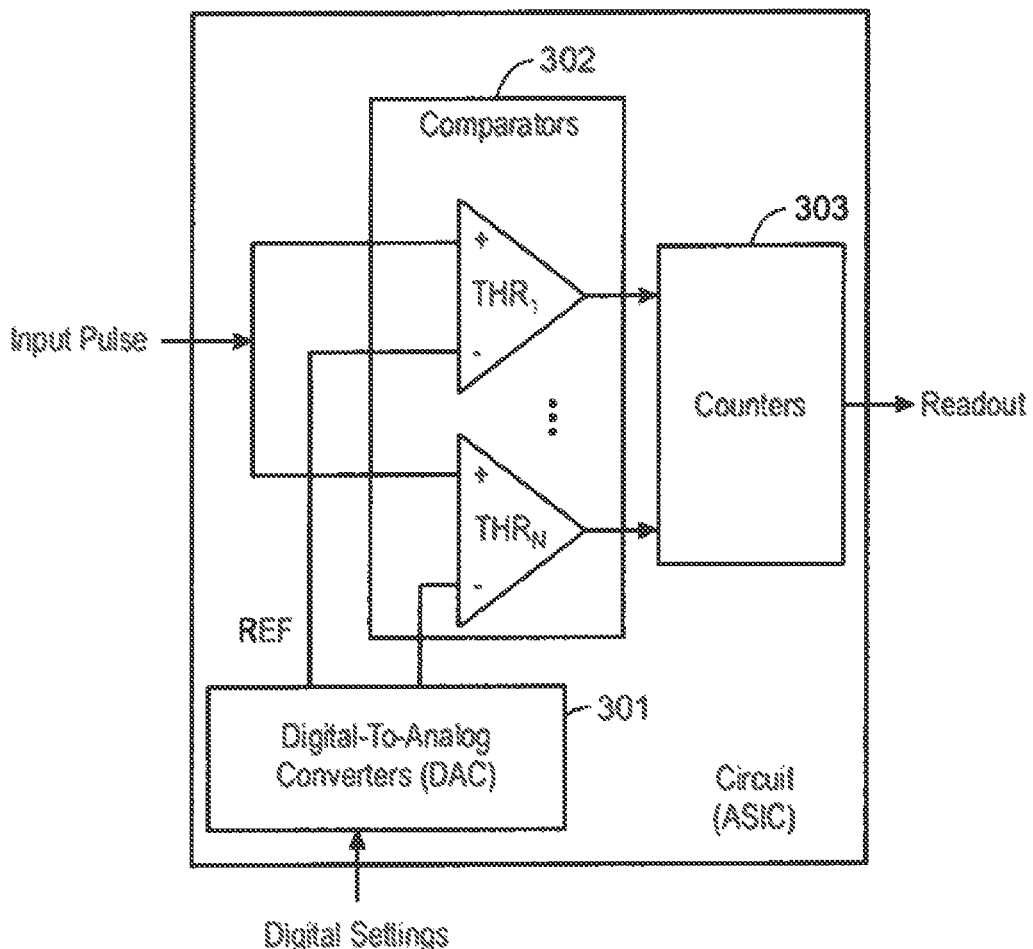
FIG. 5 is a schematic illustration of a photon counting circuit and/or device according to an exemplary embodiment.

FIG. 5 shows a schematic illustration of a photon counting circuit and/or device according to an exemplary embodiment.

When a photon interacts in a semiconductor material, a cloud of electron-hole pairs is created. By applying an electric field over the detector material, the charge carriers are collected by electrodes attached to the detector material. The signal is routed from the detector elements to inputs of parallel processing circuits, e.g., ASICs. In one example, the ASIC can process the electric charge such that a voltage pulse is produced with maximum height proportional to the amount of energy deposited by the photon in the detector material.

The ASIC may include a set of comparators 302 where each comparator 302 compares the magnitude of the voltage pulse to a reference voltage. The comparator output is typically zero or one (0/1) depending on which of the two compared voltages that is larger. Here we will assume that the comparator output is one (1) if the voltage pulse is higher than the reference voltage, and zero (0) if the reference voltage is higher than the voltage pulse. Digital-to-analog converters (DACs), 301 can be used to convert digital settings, which may be supplied by the user or a control program, to reference voltages that can be used by the comparators 302. If the height of the voltage pulse exceeds the reference voltage of a specific comparator, we will refer to the comparator as triggered. Each comparator is generally associated with a digital counter 303, which is incremented based on the comparator output in accordance with the photon counting logic.

As previously mentioned, when the resulting estimated basis coefficient line integral $\hat{A}_i$ for each projection line is arranged into an image matrix, the result is a material specific projection image, also called a basis image, for each basis i. This basis image can either be viewed directly (e.g., in projection X-ray imaging) or taken as input to a reconstruction algorithm to form maps of basis coefficients $a_i$ inside the object (e.g., in CT). Anyway, the result of a basis decomposition can be regarded as one or more basis image representations, such as the basis coefficient line integrals or the basis coefficients themselves.

It will be appreciated that the mechanisms and arrangements described herein can be implemented, combined and re-arranged in a variety of ways.

For example, embodiments may be implemented in hardware, or at least partly in software for execution by suitable image processing circuitry, or a combination thereof.

The steps, functions, procedures, and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, and/or blocks described herein may be implemented in software such as a computer program for execution by suitable image processing circuitry such as one or more processors or processing units.

In the following, non-limiting examples of specific detector module implementations will be discussed. More particularly, these examples refer to edge-on oriented detector modules and depth-segmented detector modules. Other types of detectors and detector modules may also be feasible.

Figure 6:
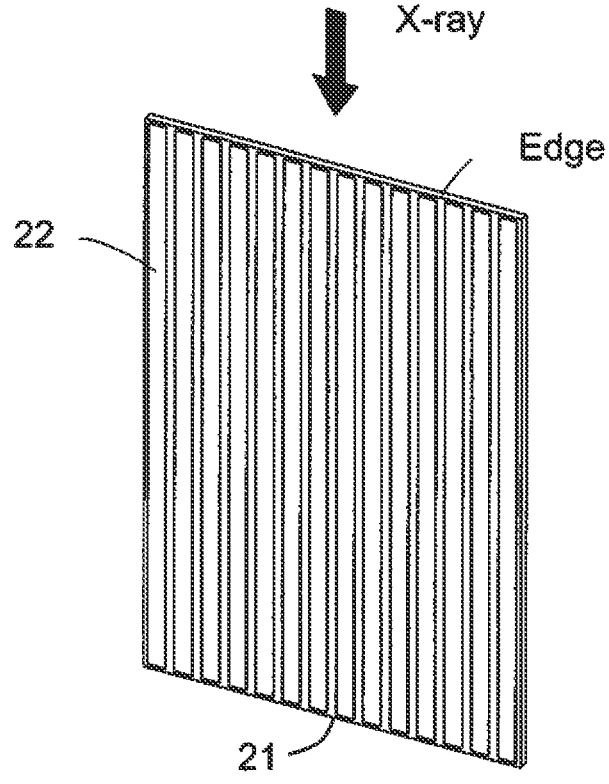
FIG. 6 is a schematic diagram illustrating an example of a semiconductor detector sub-module according to an exemplary embodiment.

FIG. 6 is a schematic diagram illustrating an example of a semiconductor detector sub-module according to an exemplary embodiment. This is an example of a detector module 21 with a semiconductor sensor having a plurality of detector elements or pixels 22, where each detector element (or pixel) is normally based on a diode having a charge collecting electrode as a key component. The X-rays enter through the edge of the detector module.

Figure 7:
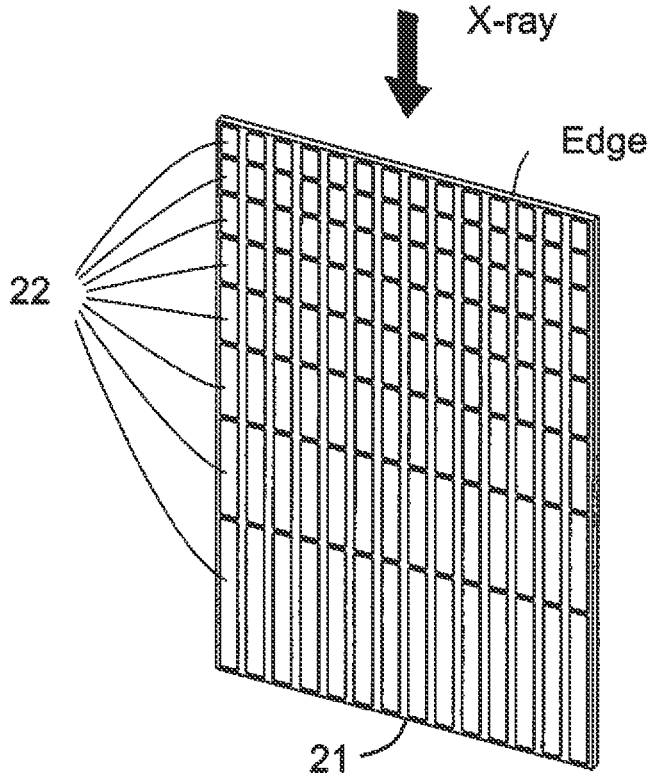
FIG. 7 is a schematic diagram illustrating an example of semiconductor detector sub-module according to another exemplary embodiment.

FIG. 7 is a schematic diagram illustrating an example of semiconductor detector sub-module according to another exemplary embodiment. In this example, the detector module 21 with the semiconductor sensor is also split into a plurality of depth segments or detector elements 22 in the depth direction, again assuming the X-rays enter through the edge of the detector module.

Normally, a detector element is an individual X-ray sensitive sub-element of the detector. In general, the photon interaction takes place in a detector element and the thus generated charge is collected by the corresponding electrode of the detector element.

Each detector element typically measures the incident X-ray flux as a sequence of frames. A frame is the measured data during a specified time interval, called frame time.

Depending on the detector topology, a detector element may correspond to a pixel, especially when the detector is a flat-panel detector. A depth-segmented detector may be regarded as having a number of detector strips, each strip having a number of depth segments. For such a depth-segmented detector, each depth segment may be regarded as an individual detector element, especially if each of the depth segments is associated with its own individual charge collecting electrode.

The detector strips of a depth-segmented detector normally correspond to the pixels of an ordinary flat-panel detector, and therefore sometimes also referred to as pixel strips. However, it is also possible to regard a depth-segmented detector as a three-dimensional pixel array, where each pixel corresponds to an individual depth segment/detector element.

The semiconductor sensors may be implemented as so called Multi-Chip Modules (MCMs) in the sense that the semiconductor sensors are used as base substrates for electric routing and for a number of ASICs which are attached preferably through so called flip-chip technique. The routing will include a connection for the signal from each pixel or detector element to the ASIC input as well as connections from the ASIC to external memory and/or digital data processing. Power to the ASICs may be provided through similar routing taking into account the increase in cross-section which is required for the large currents in these connections, but the power may also be provided through a separate connection. The ASICS may be positioned on the side of the active sensor and this means it can be protected from the incident X-rays if an absorbing cover is placed on top and it can also be protected from scattered X-rays from the side by positioning an absorber also in this direction.

Figure 8B:
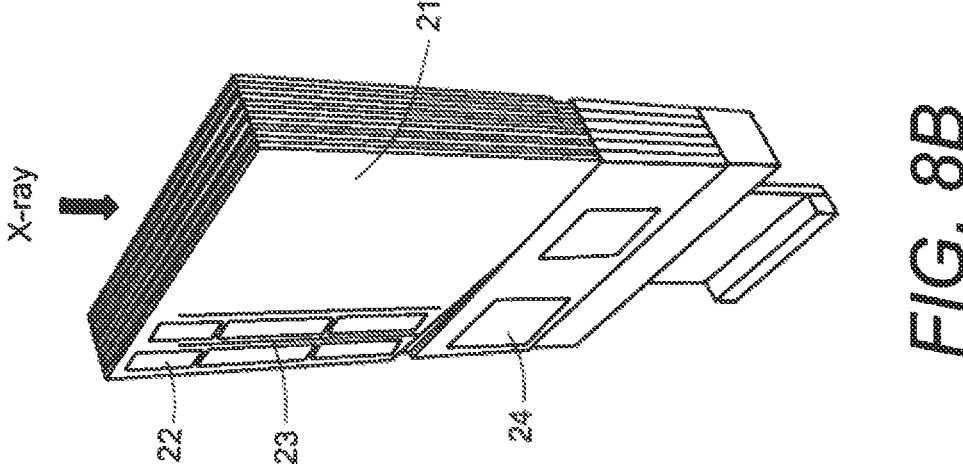
FIG. 8B is a schematic diagram illustrating an example of a set of tiled detector sub-modules, where each detector sub-module is a depth-segmented detector sub-module and Application Specific Integrated Circuits (ASICs) or corresponding circuitry are arranged below the detector sub-modules as seen from the direction of the incoming X-rays.
Figure 8A:
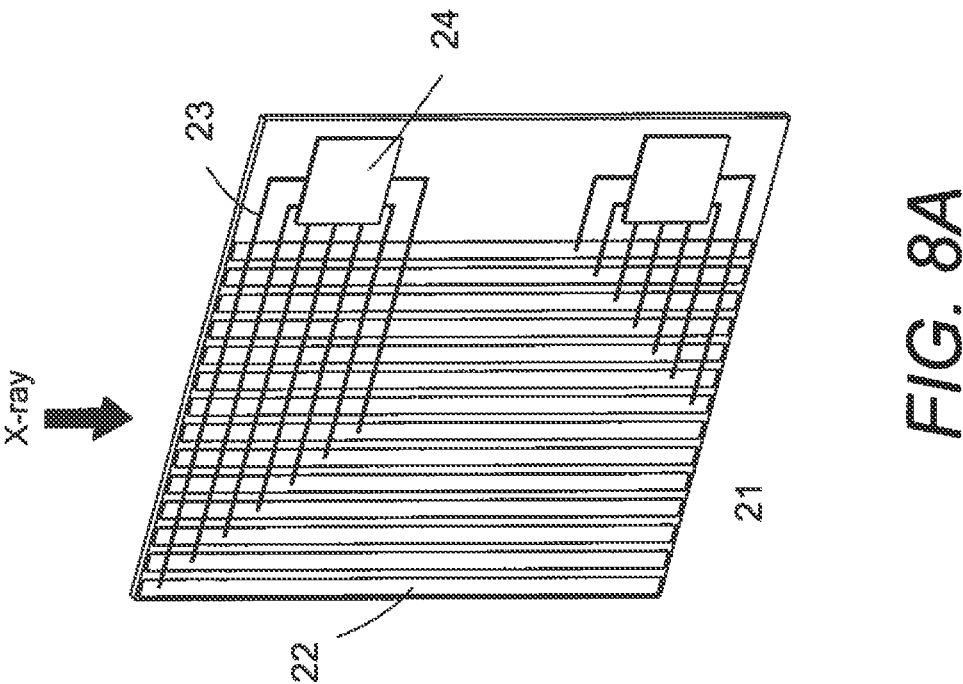
FIG. 8A is a schematic diagram illustrating an example of a semiconductor detector sub-module according to yet another exemplary embodiment.

FIG. 8A is a schematic diagram illustrating a detector module implemented as a MCM similar to embodiments in U.S. Pat. No. 8,183,535. In this example, it is illustrated how the semiconductor sensor 21 also can have the function of a substrate in a MCM. The signals are routed by routing paths 23 from the detector elements 22 to inputs of parallel processing circuits 24 (e.g., ASICs) that are positioned next to the active sensor area. The ASICs process the electric charge generated from each X-ray and converts it to digital data which can be used to detect a photon and/or estimate the energy of the photon. The ASICs may have their own digital processing circuitry and memory for small tasks. And, the ASICs may be configured for connection to digital processing circuitry and/or memory circuits or components located outside of the MCM and finally the data will be used as input for reconstructing an image.

However, the employment of depth segments also brings two noticeable challenges to a silicon-based photon counting detector. First, a large number of ASIC channels has to be employed to process data fed from the associated detector segments. In addition to the increased number of channels due to both the smaller pixel size and the depth segmentation, multi-energy bin further increases the data size. Second, since the given X-ray input counts are divided into smaller pixels, segments and energy bins, each bin has much lower signal and so the detector calibration/correction requires more than several orders of magnitude more calibration data to minimize statistical uncertainty.

Naturally, the several orders of magnitude larger data size slow down both data handling and pre-processing in addition to the need of larger computing resources, hard drive, memory, and central processing unit (CPU) or graphics processing unit (GPU). When the size of data is 10 Gigabytes instead of 10 Megabyte, for example, the data handling time, read and write, can take 1000 times longer.

A problem in any counting X-ray photon detector is the pile-up problem. When the flux rate of X-ray photons is high there may be problems in distinguishing between two subsequent charge pulses. As mentioned above, the pulse length after the filter depends on the shaping time. If this pulse length is larger than the time between two X-ray photon induced charge pulses, the pulses will grow together, and the two photons are not distinguishable and may be counted as one pulse. This is called pile-up. One way to avoid pile-up at high photon flux is thus to use a small shaping time, or to use depth segmentation.

For pileup calibration vector generation, the pileup calibration data needs to be pre-processed for spit correction. For material decomposition vector generation, the material decomposition data should preferably be pre-processed for both spit and pileup correction. For patient scan data, the data needs to be pre-processed for spit, pileup and material decomposition before the image reconstruction ensues. These are simplified examples to explain pre-processing since the actual pre-processing steps can include several other calibration steps as needed, like reference normalization and air calibration. The term processing may indicate only the final step in each calibration vector generation or patient scan, but it is used interchangeably in some cases.

FIG. 8B is a schematic diagram illustrating an example of a set of tiled detector sub-modules, where each detector sub-module is a depth-segmented detector sub-module and the ASICs or corresponding circuitry 24 are arranged below the detector elements 22 as seen from the direction of the incoming X-rays, allowing for routing paths 23 from the detector elements 22 to the parallel processing circuits 24 (e.g., ASICs) in the space between detector elements.

Figure 9:
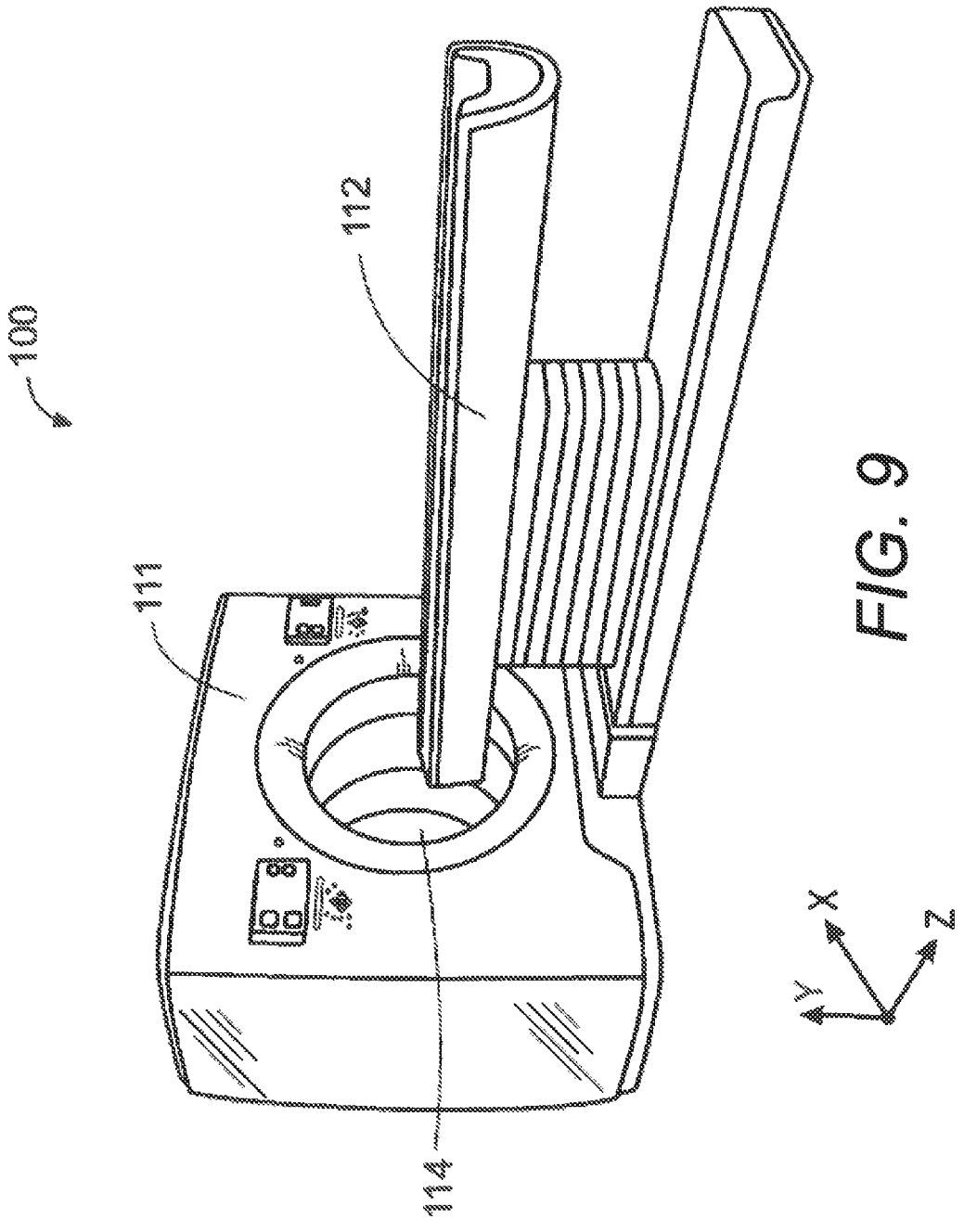
FIG. 9 is a schematic diagram illustrating an example of a CT imaging system.

FIG. 9 is a schematic diagram illustrating an overview example of a CT imaging system. In this schematic example, the overall CT imaging system 100 comprises a gantry 111, a patient table 112 that can be inserted into an opening 114 of the gantry 111 during a patient scan and/or a calibration scan. The direction of the rotational axis of a rotating member of the gantry around a subject or patient being imaged is denoted as the z-direction. The angular direction of the CT imaging system is denoted as the x-direction, and the direction of the incident X-rays is referred to as the y-direction.

It should though be understood that the rotating member and the stationary member of the gantry do not have to be part of a CT imaging system, but may be arranged and/or configured in other ways, e.g., for linear and/or translative relative movement without rotation. As an example, the X-ray source and detector combination may be moved relative to a stationary member of the overall gantry in a linear and/or translative manner. For example, the X-ray source and detector may be moved together as an aggregate assembly unit along the table axis, commonly referred to as the z-axis. Alternatively, the patient table is moved, while the X-ray source and detector combination stands still; the relative movement is the key. This also includes geometric system configurations where the patient may be standing, e.g., in a so-called phone booth type scanner.

Figure 10:
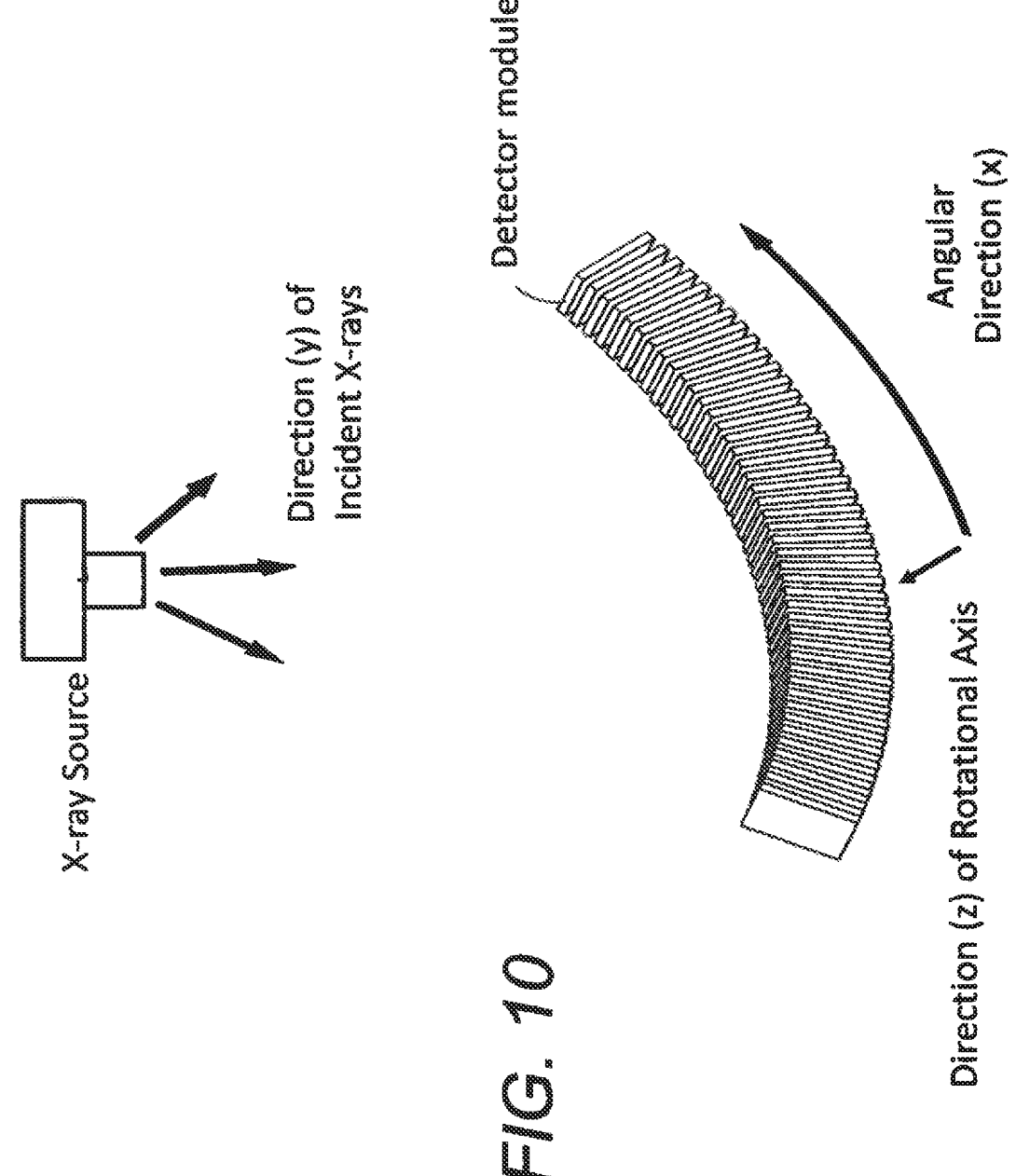
FIG. 10 is a schematic diagram illustrating an example of a design of an X-ray source and X-ray detector system.

FIG. 10 is a schematic diagram illustrating an example of an overall design of an X-ray source-detector system. In this example there is shown a schematic view of an X-ray detector comprising a plurality of detector modules and an X-ray source emitting X-rays. Each detector module may have a set of detector elements defining corresponding pixels. For example, the detector modules may be edge-on detector modules, arranged side-by-side and oriented edge-on pointing back to the X-ray source, and they may be arranged in a slightly curved overall configuration. As mentioned above, the direction of the incident X-rays is referred to as the y-direction. A plurality of detector pixels in the direction of the rotational axis of the gantry (referred as z-direction) enables multi-slice image acquisition. A plurality of detector pixels in the angular direction (referred as x-direction) enables measurement of multiple projections in the same plane simultaneously and this is applied in fan/cone-beam CT. The x-direction is sometimes also referred to as the channel direction. Most detectors have detector pixels in both the slice (z) direction and the angular (x) direction.

Figure 11:
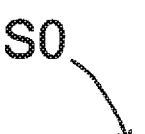
FIG. 11 is a schematic flow diagram illustrating a method for projection based spectral X-ray imaging.
Figure 11:
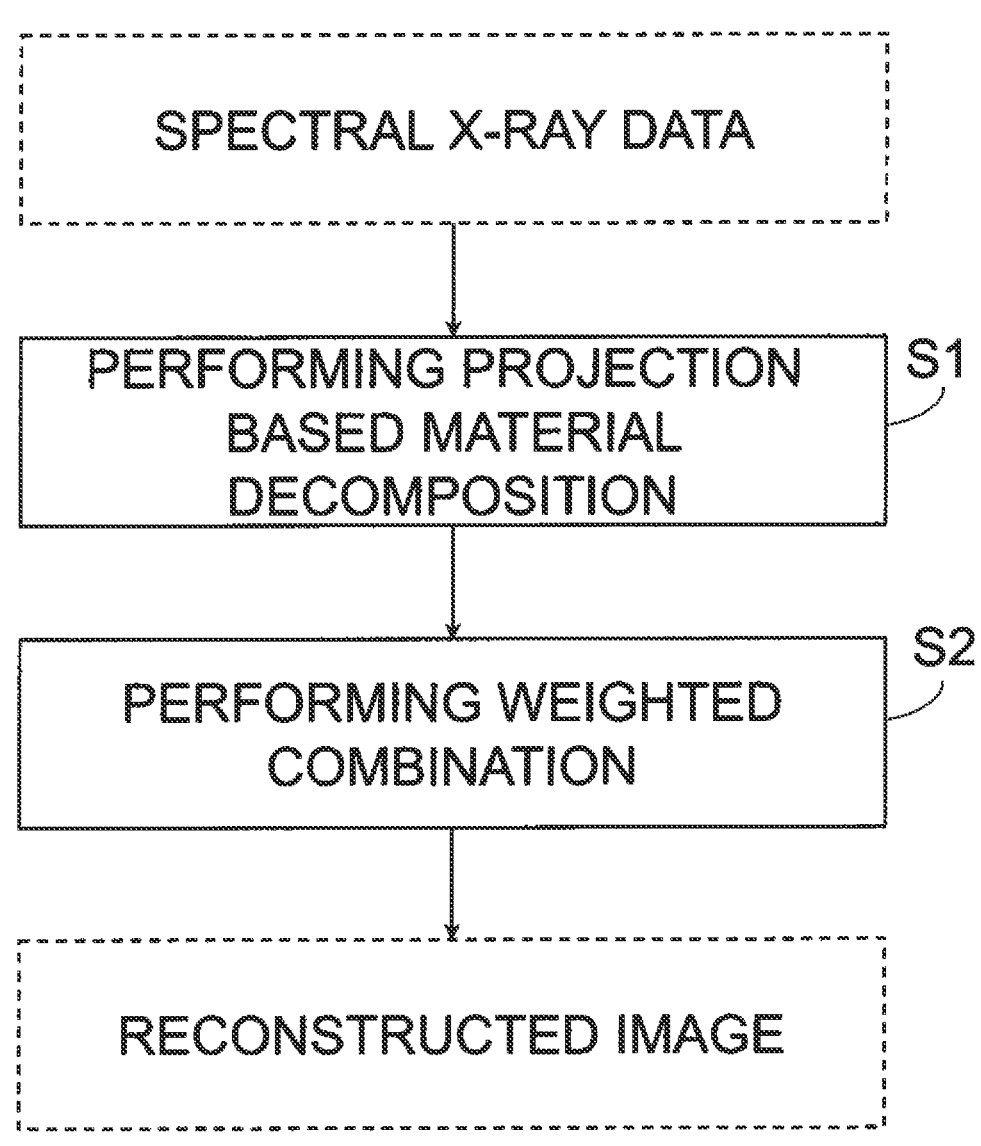

FIG. 11 is a schematic flow diagram illustrating an example of a method for projection based spectral X-ray imaging. According to an embodiment, a method S0 for projection based spectral X-ray imaging. The method includes a first step S1 of performing projection based material decomposition based on spectral X-ray data to generate a set of material basis sinograms. A next step S2 includes performing a weighted combination of at least part of at least two material basis sinograms of the set of material basis sinograms into a reconstructed image based on material weighting in the projection domain.

The projection based material decomposition is performed on each projection measurement from the spectral X-ray data. In other words, the material decomposition is performed in the projection domain. According to an example, pileup correction technique(s) may be applied to the spectral X-ray data prior to performing the projection based material decomposition. This example may improve the linearization of the X-ray detector response.

From the projection based material decomposition, the set of material basis sinograms is obtained. The generated set of material basis sinograms may comprise two material basis sinograms, or a higher amount of material basis sinograms. According to an example, the projection based material decomposition generates two material basis sinogram estimates given as:

$$\mu(E) = w_1(E)A_{jk}^1 + w_2(E)A_{jk}^2,$$

wherein $\mu(E)$ is the monoenergetic attenuation of the projection measurement, $A^1$ and $A^2$ are the material basis sinograms for bin i and pixel j for a given material, respectively, also referred to as material basis estimates, and $w_1$ and $w_2$ are the corresponding energy-dependent linear attenuation, also referred to as material basis estimates coefficients, or simply put as material weights. Hence, the selection of the mono energy E determines the relative weight of the material basis sinograms $A^1$ and $A^2$. The mono energy E may be referred to as the monochromatic energy. According to an example, the basis material images are basis sinograms.

The weighted combination of at least part of the material basis sinograms is based on adaptive material weighting. In other words, (at least part of) the material basis sinograms are weighted individually. Thus, a weight is determined for a part of and/or the whole the material basis sinogram. Hence, a mono energy may be chosen for the material basis sinograms, respectively, to obtain an optimized reconstructed image in terms of example maximizing the CNR and/or minimizing the noise. As noise and/or CNR varies based on the pathlength of the material for each projection, there is no single mono energy, chosen in the image domain, that may result in minimized noise and/or maximized CNR. The present invention is advantageous in that a weighted combination of material basis sinograms based on (adaptive) material weighting in the projection domain is performed. This entails for a more versatile, flexible, and/or accurate reconstruction of the projection into a reconstructed image. Thus, the proposed technology allows for an increased image quality in terms of e.g., decreased noise, increased CNR, and increased signal-to-noise ratio (SNR). Furthermore, the present invention enables an increased patient dose efficiency. According to an example, the patient dose efficiency may be further increased when combining the present invention with mA-modulation, also referred to as tube current modulation.

Figure 12:
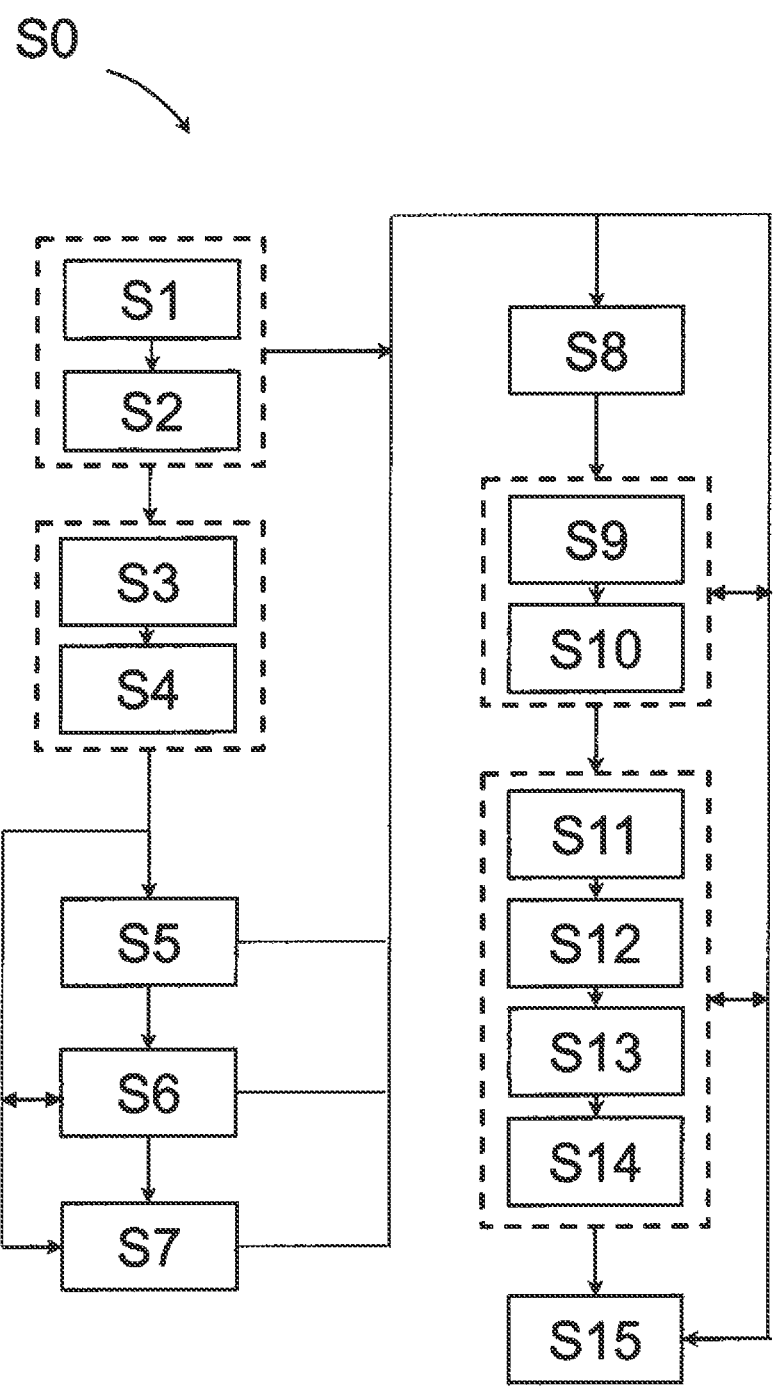
FIG. 12 is a schematic flow diagram illustrating a method for projection based spectral X-ray imaging.

FIG. 12 is a schematic flow diagram illustrating a method for projection based spectral X-ray imaging. The schematic flow diagram in FIG. 12 has several features in common with the schematic flow diagram in FIG. 11, and it is hereby referred to FIG. 11 and the associated text for an increased understanding of at least some of the features and/or functions in the flow diagram. It should also be noted that the schematic flow diagram in FIG. 12 may not disclose every available combination, permutation etc., of the steps of the method S0 of the exemplifying embodiments for the sake of simplicity. Therefore, FIG. 12 should be interpreted as non-limiting in possible alterations and/or combinations within and between the steps of the method S0 of the exemplifying embodiments.

By way of example, the step of performing S2 the weighted combination of the at least part of at least two basis sinograms may comprise determining S3 at least one of view-dependent material weights individually for each projection among a set of multiple projections, and pixel-dependent material weights individually for each pixel among a set of multiple pixels. In other words, for each projection, a corresponding weight is determined. This corresponding weight may be view-dependent and/or pixel-dependent. Thus, a combination of view-dependent and pixel-dependent material weights for each projection is feasible, as well as only one of view-dependent and pixel-dependent material weights. The view-dependent and/or pixel-dependent material weights, also referred to as the collective term material weights, may be determined such that they minimize the noise in the monoenergetic attenuation $\mu(E)$ for the generated material basis sinograms of the projection. This may be achieved by determining a mono energy that minimizes the noise in the monoenergetic attenuation $\mu(E)$ of a projection, due to the fact that the material weights are energy dependent. Thus, projection specific noise properties may be utilized to determine the material weights.

The step of performing S2 the weighted combination of the at least part of at least two basis sinograms may further comprise combining S4 the at least part of at least two material basis sinograms in the projection domain based on the at least one of the view-dependent material weights and the pixel-dependent material weights. Thus, the determined view-dependent and/or pixel-dependent material weights are applied to the at least two material basis sinograms in the projection domain, and a combined image may be generated. The material basis sinograms may be referenced to as weighted basis material sinograms, or weighted sinograms, when the determined weights are applied to them respectively. The weighted sinogram may subsequently be reconstructed into an image, a reconstructed image.

In a particular example, the step of determining S3 at least one of the view-dependent material weights and the pixel-dependent material weights may be performed based on at least one of a variance and a covariance between the at least part of at least two material basis sinograms.

The covariance between the at least part of at least two material basis sinograms may be measured at a calibration step, and/or modelled, estimated, calculated, etc. According to an example, the covariance between the at least part of at least two material basis sinograms is estimated by a forward model given as $f_{ij}(A^N_{jk})$, wherein i is the bin and $A^N_{jk}$ is the material basis estimates for pixel j, view k, and material N for sinogram A. The forward model may be determined by calculating the Cramér-Rao Lower Bound (CRLB). The required Fisher information in the case of uncorrelated bin counts may be given by calculating the Fisher matrix given as:

$$F_j = \sum_i \frac{1}{\lambda_{ijk}} [\nabla f_{ij}(A_{jk})][\nabla f_{ij}(A_{jk})]^T$$

The CRLB may then be determined by taking the inverse of the Fisher information $F_j$. In addition, the forward model may be specific to each detector element in the X-ray imaging system. Furthermore, for additional noise models, the same method of estimating the variance between the at least part of at least two material basis sinograms may be applied, but with different definitions of the Fisher matrix. According to an example, the (at least part of) material basis sinograms may be filtered in at least one of a view direction and a pixel direction before determining the covariance between the (at least part of) material basis sinograms.

The variance for a given mono energy is given as $w(E)^T F^{-1} w(E)$. According to an example, for a given $F_j$, the variable $w_{min}$ may be determined by representing the minimizer of the variance for the given mono energy. The variable $w_{min}$ represents optimal mono energy material weights for material basis sinograms $A_{jk}$. According to another example, $w_{min}$ may instead be determined by maximizing the CNR given by:

$$\frac{(W(E)^T (A^1 - A^2))}{(W(E)^T F^{-1} w(E))}$$

According to an example, the (at least part of) material basis sinograms may be filtered in at least one of a view direction and a pixel direction before determining the variance of the (at least part of) material basis sinograms, respectively.

In a particular example, the step of determining S3 at least one of the view-dependent material weights and the pixel-dependent material weights may comprise maximizing or minimizing S5 a first objective function, with respect to at least one of noise, artifacts, delineation of anatomical features, pileup, ratio, signal-to-noise ratio (SNR) and contrast-to-noise ratio (CNR) of the reconstructed image. Hence, by maximizing or minimizing S5, i.e., optimizing, a first objective function, all or only some of said image properties may be taken into account. The first objective function may also be optimized in such way that a trade-off between said image properties is achieved.

In a non-limiting example, the step of determining S3 at least one of the view-dependent material weights and the pixel-dependent material weights may comprise selecting S6 a region of interest (ROI) and determining at least one of the view-dependent material weights and the pixel-dependent material weights in the ROI.

It should be noted that the selected ROI when determining S3 at least one of the view-dependent and pixel-dependent material weights may be a common, shared, same ROI for all of the at least part of at least two material basis sinograms. The selected ROI may be a plurality of ROIs in corresponding material basis sinograms, wherein the plurality of ROIs are overlapping, thus forming the (common) selected ROI. The view-dependent and/or the pixel-dependent material weights may be calculated based on measurements in the selected ROI, but may then be applied to a second region of the material basis sinograms. In other words, the weighted combination of the at least part of at least two material basis sinograms is performed in the second region. The second region may comprise the selected ROI, or only a part of the selected ROI. In some examples, the selected ROI is excluded from the second region. The second region is preferably larger than the selected ROI. According to an example, determining S3 the view-dependent and/or pixel-dependent material weights may be performed by forward-projection based on measurements in the selected ROI. According to an example, the materials to be decomposed may be selected for example based on a chosen scan protocol. $A^1$ and $A^2$ may from here be selected based on these materials. This may be achieved by e.g., segmenting the materials and applying a forward projection model to obtain the segmented material basis sinograms.

According to an example, a classifier algorithm may identify at least two materials in the selected ROI. The classifier algorithm may be a part of a machine learning system. The view-dependent and/or the pixel-dependent material weights may be determined to maximize the detectability of the at least two materials in the selected ROI. According to another example, a plurality of ROIs may be selected for the at least part of at least two material basis sinograms, wherein the plurality ROIs do not need to overlap fully. Thus, the several selected ROIs may be the same, or different to as least some degree. Furthermore, according to the example, a classifier algorithm may identify a plurality of at least two materials in the plurality of selected ROIs. The materials in different ROIs may be the same or different. The view-dependent and/or the pixel-dependent material weights may be determined to maximize a combination of the detectability of the at least two materials in the selected ROIs.

In another non-limiting example, at least one of the view dependent material weights and pixel-dependent material weights may be at least one of constrained inside a predetermined reference interval based on a predetermined material weight, and parameterized as a function of a material or a signal level. The view-dependent and/or pixel-dependent material weights may be parametrized in such way that a trade-off between for example CNR and artifact suppression is achieved. Furthermore, the predetermined reference interval, referred to as $w_{ref}$, may be parametrized of a function of a material or a signal level. For example, the material function may depend on $A^N_{jk}$.

In a particular example, the step of determining at least one of the view-dependent material weights and the pixel-dependent material weights may comprise maximizing or minimizing S7 a second objective function with respect to material separation of a plurality of materials. The second objective function may be the same, or different, compared to the first objective function.

In a particular example, at least one of the view dependent material weights and the pixel-dependent material weights, and a predetermined material weight, may be parameterized as a third objective function of at least one of i) an estimated gradient in at least one of the view direction and the pixel direction of the projection, and ii) an estimated gradient of a reconstructed image, to compensate for bias. The third objective function may be the same, or different, compared to the first objective function and/or the second objective function. For example, the third objective function may take additional parts and/or aspects of the material basis sinograms compared to the first and/or second objective function.

In a non-limiting example, the step of determining at least one of the view-dependent material weights and the pixel-dependent material weights may be performed by a first machine learning system. The first machine learning system may comprise one or several machine learning models such as decision trees, support vector machines, neural networks, etc. According to an example, the first machine learning system may comprise machine-learning architecture and/or machine-learning algorithms which may at least partially be based on a convolutional neural network model. According to another example, the first machine learning system may comprise machine-learning architecture and/or machine-learning algorithm which may at least partially be based on at least one of decision tree model and a support vector machine model.

In another non-limiting example, the first machine learning system may comprise a trained first convolutional neural network (CNN). The step of determining at least one of the view-dependent material weights and the pixel-dependent material weights is performed by the first CNN. The first CNN is trained for at least one of mapping the at least part of at least two material basis sinograms to the at least one of the view-dependent material weights and pixel-dependent material weights, and estimating at least one of a variance and a covariance based on a mapping between the at least part of at least two material basis sinograms and a fourth objective function.

Thus, the first CNN is trained for mapping (at least part of) the material basis sinograms to the view-dependent and/or pixel-dependent material weights, and/or estimating a variance and/or a covariance based on a mapping between (at least part of) the material basis sinograms and a fourth objective function. The fourth objective function may be the same, or different, from the first, second, and third objective function. The fourth objective function may be the CRLB. According to an example to obtain a trained first CNN, the view-dependent and/or pixel-dependent material weights for a common imaging task may be determined for several phantom images. The determined view-dependent and/or pixel-dependent material weights may then be used to train the first CNN. The output from the first CNN may be a map of view-dependent and/or pixel-dependent material weights. According to yet another example, the CNN may be trained for outputting a low-noise variance map. The low-noise variance map may be used for determining at least one of the view-dependent and/or pixel-dependent material weights. The use of a first CNN is advantageous in that further optimized material weights may be obtained, and accordingly, obtain a reconstructed image with relatively low noise and high resolution. Furthermore, providing a first CNN for determining the material weights may mitigate the need for human interaction, decisions, etc., or remove the need completely. Furthermore, the use of a first CNN for determining the material weights may result in a reduced computational time.

In a particular example, the step of performing S2 the weighted combination of the at least part of at least two material basis sinograms may be performed by a second machine learning system by mapping the at least part of at least two material basis sinograms into the reconstructed image. The second machine learning system may be the same, or different, compared to the first machine learning system. The second machine learning system may comprise one or several machine learning models, such as decision trees, support vector machines, neural networks, etc. According to an example, the second machine learning system may comprise machine-learning architecture and/or machine-learning algorithms which may at least partially be based on a convolutional neural network. According to another example, the second machine learning system may comprise machine-learning architecture and/or machine-learning algorithm which may at least partially be based on at least one of decision tree model and a support vector machine model. According to an example, a (same) machine learning system is configured to determine S3 the view-dependent and/or the pixel-dependent material weights, as well as performing S2 the weighted combination of the (at least part of) material basis sinograms into the reconstructed image. It should be noted that it is equally feasible that it is only the step of performing S2 a weighted combination of the (at least part of) material basis sinograms that is performed by a machine learning system, i.e., not determining S3 the material weights.

In a particular example, the second machine learning system may comprise a trained second convolutional neural network (CNN), wherein the step of performing the weighted combination of the at least two material basis sinograms is performed by the second CNN, being trained on at least sinograms obtained from at least one of simulated images, phantom images, and patient images. The second CNN may be the same, or different, compared to the first CNN.

According to another particular example, a final reconstructed image may be generated by a fourth machine learning system comprising a third trained CNN. The fourth machine learning system may be the same, or different, compared to the first and/or second machine learning system. The third CNN may be the same, or different, compared to the first and/or second CNN. The CNN may be trained on at least sinograms obtained from simulated images, phantom images, and/or patient images. The CNN may be optimized such that the final reconstructed image achieves optimal CNR for different pathlengths. The CNN may further be optimized such that the final reconstructed image achieves minimum bias and/or preserved edges. The input to the CNN may be a combination of at least two of parameters of the various material basis sinograms A, $A^S$, $A^f$ and the material weights $w_{min}$, $w_{ref}$. Alternatively, CNN may instead be configured to generate a bias map. The generated bias map may thereafter be combined with the already determined $w_{min}$ $(A^S_{jk})A_{jk}$ to generate the final reconstructed image.

By way of example, a training set of material basis sinograms and basis material weights may be generated, and an optimal combination of these sinograms may be selected manually or through a numerical optimization in order to select a weighting scheme that gives optimal image quality for the reconstructed image as measured through an objective or subjective image quality metric. For example, the optimal weights for several different imaging tasks may be computed, and a combination of these may be selected at least partially manually, by forming an angle- and pixel-dependent weighted average of the different weight maps. After applying this method to find the optimal weighted sinogram for the sinograms in the training set, the CNN can be trained to map a set of at least two of parameters of the various material basis sinograms and the material weights to the optimal combination of the basis sinograms. In this way, the same image quality as for the training set can be obtained using the CNN without going through a manual or optimization-based search for the optimal way of combining the sinograms.

In a non-limiting example, the step of performing S2 the weighted combination of at least part of at least two basis sinograms may comprise iterative forward-projection. The iterative forward-projection comprises computing S8 an estimated forward projection of the at least part of at least two material basis sinograms, wherein the weighted combination may be based at least partly on the estimated forward projection.

In another non-limiting example, the method S0 may comprise at least one of filtering S9 and downsampling S10 at least a portion of at least one of the spectral X-ray data, and the at least part of at least two material basis sinograms to compensate for at least one of low-signal, photon starvation, and noise. Hence, filtering S9 and/or downsampling S10 may be performed before and/or after performing S1 the projection based material decomposition. For example, low-pass filtered material basis sinograms portions, $A^S_{jk}$, may be obtained by low-pass filtering and decimation in the view and/or pixel direction of at least a portion of the material basis sinograms, $A_{jk}$. The low-pass filtered material basis sinograms, $A^S_{jk}$, may vary to a relatively lesser degree so that the minimum noise estimate itself do not introduce additional noise. According to this example, the risk of suppressing high-frequency content is reduced. For each bin i, the minimum noise is chosen for each decimated pixel j and view k. The adaptively weighted material basis sinograms, $A^f_{jk}$, for pixel j, and view k, may then be obtained as $w_{min}(A^S_{jk})A_{jk}$. According to an example, the decimation is omitted, whereas the minimum noise i chosen for each pixel and view, based on $A^S_{jk}$.

According to an example, different levels of filtrated material basis sinograms, $A^S_{jk}$, may be used to reduce for example the variance of $A^S_{jk}$ to compensate for material basis sinograms comprising relatively low signals, and/or photon starvation.

In another non-limiting example, the method further comprises bias-adjusting at least one of a first weighted material basis sinogram and a reconstructed image to generate a bias-adjusted reconstructed image. The bias-adjusting is done by at least one of performing Fourier domain splitting, in the projection domain of the first weighted sinogram and a weighted filtered sinogram and combining at least a portion of the Fourier domain split first weighted sinogram and at least a portion of the Fourier domain split weighted filtered sinogram to generate a bias-adjusted material sinogram, wherein the bias-adjusted sinogram is reconstructed into the bias-adjusted reconstructed image, and performing Fourier domain splitting in the image domain of a first reconstructed image reconstructed from a weighted sinogram and a second reconstructed image reconstructed from a weighted filtered sinogram and combining at least a portion of the Fourier domain split first reconstructed image and at least of the Fourier domain split second reconstructed image to generate the bias-adjusted reconstructed image. It is to be understood, that a weighted sinogram, or weighted basis material sinogram, may be defined as a combination of the at least two material basis sinograms in the projection domain based on determined material weights. A weighted filtered sinogram may be a material basis sinogram that is filtered or downsampled, e.g., to compensate for low-signal, photon starvation and/or noise, and to which material weights are applied. The material weights may be determined in different manners, as disclosed throughout the application. A reference sinogram may be a different weighted sinogram and/or a filtered weighted sinogram. A reconstructed image may be reconstructed from the weighted sinogram, the filtered weighted sinogram and/or a bias-adjusted material basis sinogram. The bias-adjusted material basis sinogram may be referenced as a weighted bias-adjusted material basis sinogram. It is also to be understood that a Fourier domain split sinogram, or Fourier domain split reconstructed image, is a sinogram or image upon which Fourier domain splitting has been done.

Hence, different parts of the material basis sinograms may be processed in different ways, such as by filtering and/or bias-adjusting. For example, a weighted sinogram may be combined with a weighted filtered sinogram by performing Fourier domain splitting of two weighted, filtered or non-filtered, material basis sinograms to generate Fourier domain-split material basis sinograms, which in turn may be combined to generate a weighted bias-adjusted material basis sinogram. It should be noted that at least a part of the material basis sinograms may be omitted in said filtering and/or bias-adjusting, thus resulting in an initial, unprocessed, native, etc., part of the material basis sinograms. At least two of the various parts of the material basis sinograms, such as the initial part of the material basis sinograms, A, the filtered part of the material basis sinograms, A$^S$, and the bias-adjusted part of the material basis sinograms, A$^{fc}$, may be blended in the Fourier domain. Hence, any combination of the presence of an initial part, A, a filtered part, A$^S$, and a bias-adjusted part, A$^{fc}$, of the material basis sinograms when performing Fourier domain splitting is feasible.

The bias-adjusted material basis sinograms, A$^{fc}$, may be obtained by performing the following:

$$w_{min}\left(A_{jk}^S\right)A_{jk} - \left(w_{min}\left(A_{jk}^S\right) - w_{ref}\right)A_{jk}^S$$

This allows combination of low spatial frequencies from the sinogram weighted by $w_{ref}$ with high spatial frequencies from the sinogram weighted by $w_{min}$ and produce a bias-corrected weighted sinogram, which can subsequently be reconstructed into an image. Blending the different frequencies may be achieved by splitting the frequencies of the various parts of the (weighted) material basis sinograms, thus generating Fourier domain-split (weighted) material basis sinograms. The Fourier domain-split material basis sinograms are then combined. For example, relatively high frequencies may be dominated by the filtered part of the material basis sinograms, A$^f$. This may result in a reduced presence of noise. Furthermore, relatively low frequencies may be dominated by the initial part of the material basis sinograms, A. This may result in an increased bias-correction. According to an example, different levels of filtrated material basis sinograms, A$^S_{jk}$, may be combined to improve the bias correction. The bias-adjusting may be given by:

$$b = \sum_m w_m\left(w_{min} - w_{ref_m}\right)A_m^S,$$

wherein m represents different levels of filtration.

According to an example, the Fourier domain splitting may be performed in the image domain instead of in the projection domain. This may be achieved by first reconstructing the weighted material basis sinograms $w_{min}(A_{jk}^S)$ A$_{jk}$ into weighted material basis images and reconstructing the reference material basis sinograms $$w_{min}\left(A_{jk}^S\right)A_{jk}$$

into reference weighted material basis images. A$^{ref}_{jk}$ may refer to for example basis sinograms weighted with reference weights $w_{ref}$ A$_{jk}$, to the original determined material basis sinograms, A$_{jk}$, or to the filtrated material basis sinograms, A$^S$. The reconstructed weighted material basis images and reference weighted basis material images are thereafter blended in the Fourier domain. For example, they may be low-pass filtered, for example by Fourier transformation, weighting and inverse transformation, whereafter bias-corrected basis material images are generated as:

$$R\left[w_{min}\left(A_{jk}^S\right)A_{jk}\right] - R\left[w_{min}\left(A_{jk}^S\right)A_{jk}\right]^S + R\left[A_{jk}^{ref}\right]^S$$

where R denotes the reconstruction operator and S denotes low pass filtering.

In a particular example, the step of performing S2 the weighted combination of at least two material basis sinograms may comprise determining S15 a matrix of material weights comprising at least a first material weight and a second material weight individually for each at least one of a projection and pixel, wherein the second material weight is orthogonal to the first material weight. Thus, the resulting material basis sinograms consists of vector-valued material basis sinograms.

The matrix, referred to as W, comprises material weights comprising at least a first material weight, $w_{min}$ (A$^S_{jk}$) and a second material weight, $w^\perp_{min}$(A$^S_{jk}$). Thus, the second material weight is the unit vector orthogonal to the first material weight. The vector-valued material basis sinograms is obtained by replacing $w_{ref}$ with W in the previously mentioned equation. Next step is to left-multiply said equation with a constant orthonormal matrix $w_{ref}$. The resulting bias-adjusted material basis sinograms A$^{fc}$ may finally be obtained by:

$$A_{jk}^{fc} = A_{jk}^S + W_{ref}^T W\left(A_{jk}^S\right)\left(A_{jk} - A_{jk}^S\right)$$

Since W (A$^S_{jk}$) and $w_{ref}$ are orthonormal matrices, their product is a rotational matrix. The given example, comprising the matrix, W, comprising at least a first and a second material basis sinograms, can thus be interpreted as a transform that rotates $A_{jk}$ around $A^S_{jk}$.

Figures 13A, 13B:
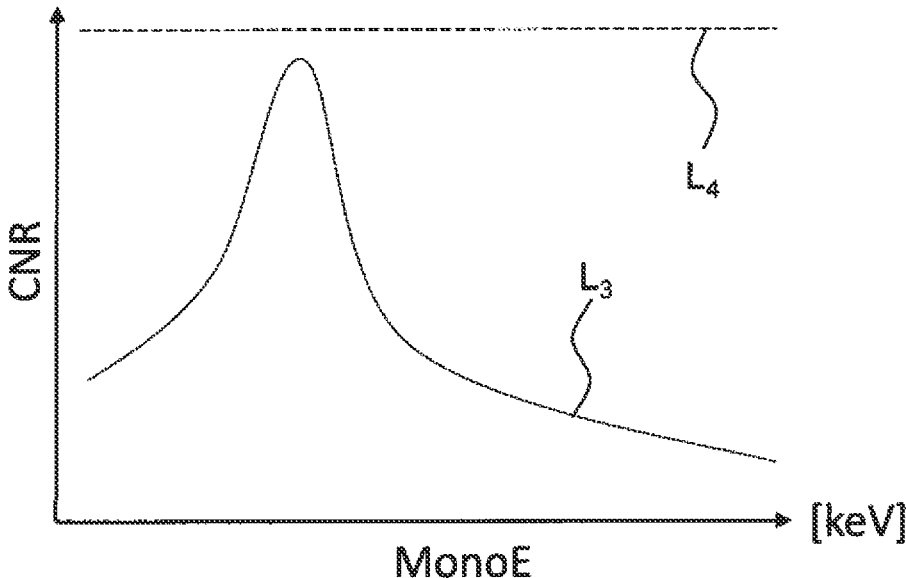
FIGS. 13A and 13B are graphs illustrating a relation between variance and mono energy.

FIGS. 13A and 13B are graphs illustrating a relation between variance and mono energy. In FIGS. 13A and 13B, the CNR is shown on the vertical axis and the mono energy, MonoE, is shown on the horizontal axis in keV. In FIG. 13A, the dotted line, $L_1$, represents a first relation between the variance and the mono energy, for longer path lengths. The dashed lined, $L_2$, represents a second relation between the variance and the mono energy, for shorter path lengths. The CNR/noise varies based on the material thickness for each projection, meaning that an optimal mono energy may vary with each view and/or pixel.

$$E_1^{opt}$$

is the optimized mono energy that minimizes noise/maximizes CNR for $L_1$, and $$E_2^{opt}$$

is the optimized mono energy that minimizes noise/maximizes CNR for $$L_2 \cdot E_1^{opt}$$

and $$E_2^{opt}$$

are different, thus there is no single mono energy that can be chosen in the image domain that maximizes CNR and/or minimizes noise.

In FIG. 13B, the dotted line, $L_3$, represents a relation between the variance and the mono energy. $L_3$ represents CNR of one insert as a function of monoE. The dashed line, $L_4$, represents the CNR of a reconstructed image, after weighted combination in the projection domain of at least two material basis sinograms according to an embodiment of the present invention.

Figure 14:
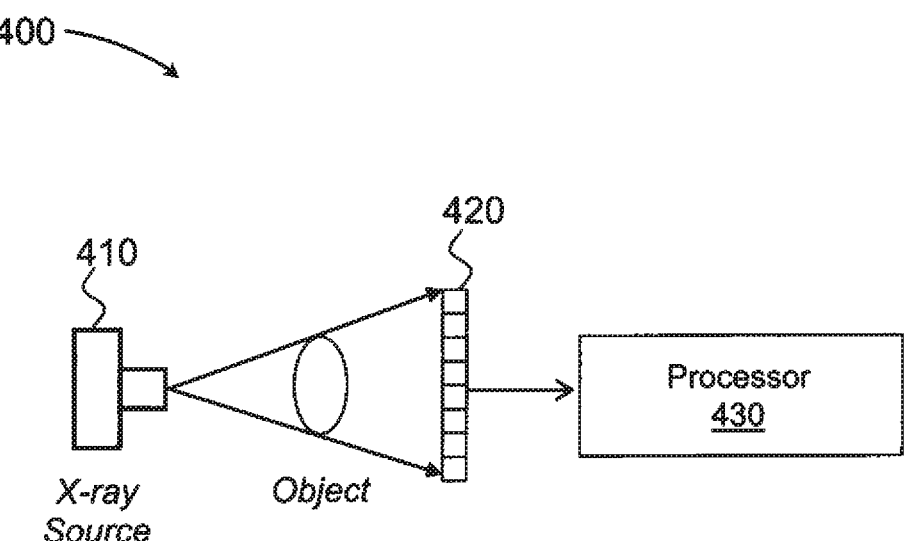
FIG. 14 is a schematic diagram illustrating certain relevant parts of an X-ray imaging system.

FIG. 14 is a schematic diagram illustrating certain relevant parts of an X-ray imaging system, such as a CT imaging system. The CT imaging system 400 comprises an X-ray source 410 configured to emit X-rays, an X-ray detector 420 configured to generate spectral X-ray data, and a processor 430. The processor 430 is configured to perform projection based material decomposition on the spectral X-ray data to generate a set of material basis sinograms, and perform a weighted combination of at least part of at least two material basis sinograms of the set of material basis sinograms into a reconstructed image based on material weighting in the projection domain.

The processor 430 may comprise digital and/or analog processing circuitry. The processor 430 may form a part of, or the whole of, an imaging processing system. For an increased understanding of the processor, reference is made to FIGS. 2-8 and associated texts.

In a particular example, the processor 430 may be configured to determine at least one of individual view-dependent material weights for each projection among a set of multiple projections, and individual pixel-dependent material weights for each pixel among a set of multiple pixels. The processor 430 is further configured to combine the at least part of at least two material basis sinograms in the projection domain based on the at least one of the view-dependent material weights and the pixel-dependent material weights.

In another particular example, the processor 430 may be configured to determine at least one of the view-dependent material weights and the pixel-dependent material weights based on at least one of a variance and a covariance between the at least part of the at least two material basis sinograms.

In a non-limiting example, the processor 430 may be configured to determine at least one of the view-dependent material weights and the pixel-dependent material weights based on maximizing or minimizing a fifth objective function, with respect to at least one of noise, artifacts, delineation of anatomical features, pileup, ratio, signal-to-noise ratio (SNR) and contrast-to-noise ratio (CNR) of the reconstructed image.

In another non-limiting example, the processor 430 may comprise a third machine learning system 440 configured to perform the weighted combination of the at least part of at least two material basis sinograms by mapping the at least part of at least two material basis sinograms into the reconstructed image.

It should be understood that the CT imaging system may comprise any 3-D X-ray based medical imaging modalities. For example, the CT imaging system may comprise a general tomography system which is adapted to taking images from different angles and combining the information in them to create an image volume where every slice can be individually reviewed. The CT imaging system may comprise a CT system adapted to use an angular range of a full 180-degree range and/or a limited angular range. In other words, the CT system may comprise a normal computed tomography system using a full 180-degree range, or a breast tomosynthesis system, also called mammogram, using a limited angular range.

In this example, the CT system includes an X-ray source 110 and an X-ray detector 120 arranged in the beam path of the X-rays in such a way that projection images of the subject or object can be acquired in different viewing angles. This is most commonly achieved by mounting the X-ray source 110 and the X-ray detector 120 on a support, e.g., a rotating member of a gantry, that is able to rotate around the subject or object.

As mentioned, at least some of the steps, functions, procedures, and/or blocks described herein may be implemented in software such as a computer program for execution by suitable image processing circuitry such as one or more processors or processing units.

Figure 15:
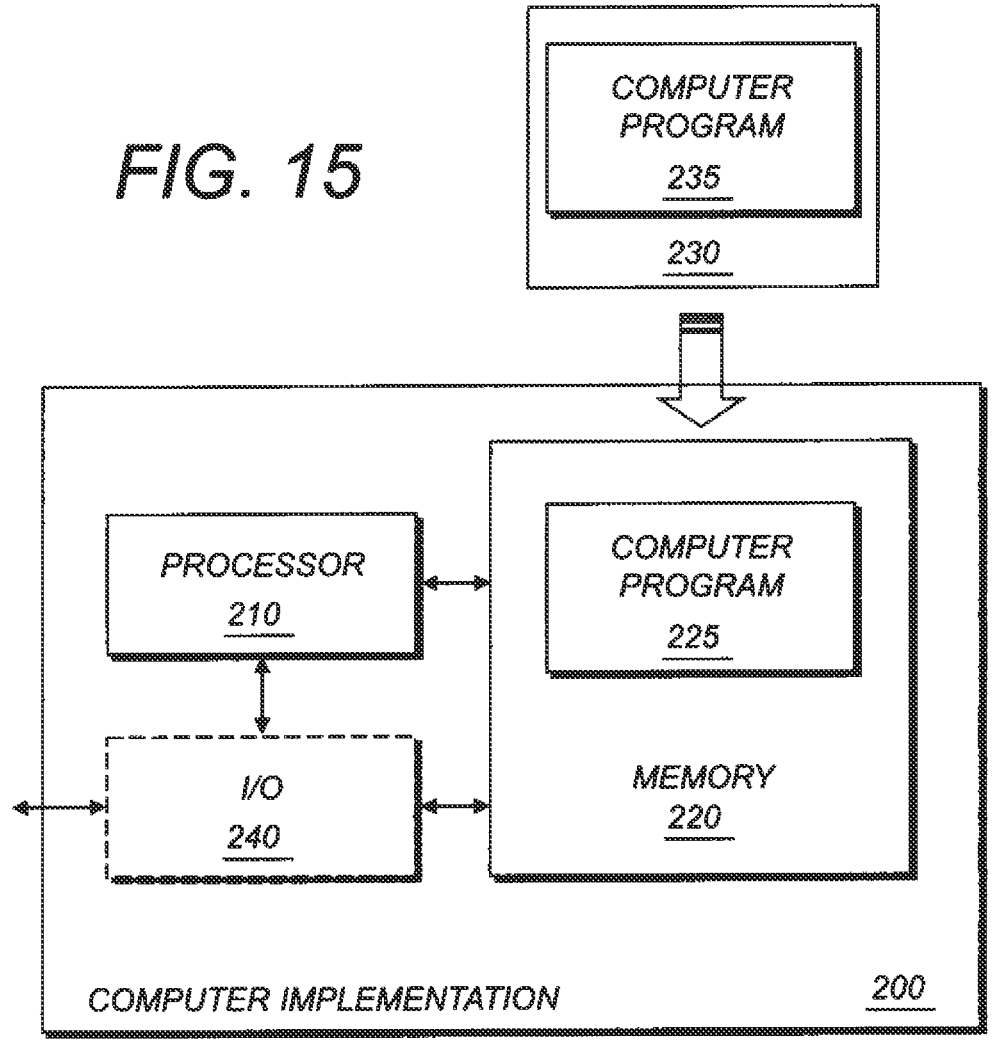
FIG. 15 is a schematic diagram illustrating an example of a computer implementation according to an embodiment.

FIG. 15 is a schematic diagram illustrating an example of a computer implementation according to an embodiment. In this particular example, the system 200 comprises a processor 210 and a memory 220, the memory comprising instructions executable by the processor, whereby the processor is operative to perform the steps and/or actions described herein. The instructions are typically organized as a computer program 225; 235, which may be preconfigured in the memory 220 or downloaded from an external memory device 230. Optionally, the system 200 comprises an input/output interface 240 that may be interconnected to the processor(s) 210 and/or the memory 220 to enable input and/or output of relevant data such as input parameter(s) and/or resulting output parameters.

In a particular example, the memory 220 comprises a set of instructions executable by the processor, whereby the processor is operative to perform the steps and/or actions described herein.

The term processor should be interpreted in a general sense as any system or device capable of executing program code or computer program instructions to perform a particular processing, determining or computing task.

The image processing circuitry including one or more processors is thus configured to perform, when executing the computer program, well-defined processing tasks such as those described herein.

The image processing circuitry does not have to be dedicated to only execute the above-described steps, functions, procedure and/or blocks, but may also execute other tasks.

The proposed technology also provides a computer-program product comprising a computer-readable medium 220; 230 having stored thereon such a computer program.

By way of example, the software or computer program 225; 235 may be realized as a computer program product, which is normally carried or stored on a computer-readable medium 220; 230, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the image processing circuitry thereof.

Method flows may be regarded as a computer action flows, when performed by one or more processors. A corresponding device, system and/or apparatus may be defined as a group of function modules, where each step performed by the processor corresponds to a function module. In this case, the function modules are implemented as a computer program running on the processor. Hence, the device, system and/or apparatus may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein.

Alternatively, it is possible to realize the modules predominantly by hardware modules, or alternatively by hardware. The extent of software versus hardware is purely implementation selection.

Embodiments of the present disclosure shown in the drawings and described above are example embodiments only and are not intended to limit the scope of the appended claims, including any equivalents as included within the scope of the claims. It will be understood by those skilled in the art that various modifications, combinations, and changes may be made to the embodiments without departing from the present scope as defined by the appended claims. It is intended that any combination of non-mutually exclusive features described herein are within the scope of the present invention. That is, features of the described embodiments can be combined with any appropriate aspect described above and optional features of any one aspect can be combined with any other appropriate aspect. Similarly, features set forth in dependent claims can be combined with non-mutually exclusive features of other dependent claims, particularly where the dependent claims depend on the same independent claim. Single claim dependencies may have been used as practice in some jurisdictions require them, but this should not be taken to mean that the features in the dependent claims are mutually exclusive.

It is further noted that the inventive concepts relate to all possible combinations of features unless explicitly stated otherwise. In particular, different part solutions in the different embodiments can be combined in other configurations, where technically possible.

DEFINITION OF TERMS

In the following description of non-limiting examples, the below notations and definitions is primarily used herein: Indices i=Bin, j=Pixel, k=View $A^N$ Native level MD sinogram, for material N, where N=1, 2, . . . . $A^N$ is normally simply referred to as A for a given material;

The sinogram A may be suitably selected for a specific region of interest and optionally pre-processed.

MD Material Decomposition.

$$A_{jk}^N$$

Material basis estimates for pixel j, and view k for sinogram A. The material basis estimates are often interchangeably referred to as material thickness estimates.

$$A_{jk}^N$$

is sometimes simply referred to as $A_{jk}$ for a given material. $A^S$ Low pass filtered MD sinogram.

$$A_{jk}^S$$

Low pass filtered material basis estimates for pixel j, and view k.

$$A_{jk}^{ref}$$

Reference material basis estimates for pixel j, and view k, representing a previously determined material basis estimates.

$A^f$ Adaptively weighted MD sinogram.

$A_{jk}^f$. Adaptively weighted material basis estimates for pixel j, and view k.

$A^{fc}$ Adaptively weighted, bias-corrected MD sinogram.

$$A_{jk}^{fc}$$

Adaptively weighted, bias-corrected basis estimates for pixel j, and view k.

$f_{ij}(A_{jk})$ Forward model for pixel j, bin i.

$F_{ij}$ Fisher matrix for pixel j, bin i.

w(E) Material weights for mono energy E.

$w_{opt}(A)$ A function which returns the optimal weight for a given projection A and task function.

$w_{ref}$ A reference weighting representing a given reference mono energy.

$w_{min}(A_{jk})$ Optimal mono energy material weights for $A_{jk}$.

CRLB Cramer-Rao Lower Bound.

The invention claimed is:

1. A method for projection based spectral X-ray imaging, the method comprising:

performing projection based material decomposition based on spectral X-ray data to generate a set of material basis sinograms; and performing a weighted combination of at least part of at least two material basis sinograms of the set of material basis sinograms into a reconstructed image based on material weighting in the projection domain.

2. The method of claim 1, wherein the step of performing the weighted combination of the at least part of at least two material basis sinograms comprises:

determining at least one of:

view-dependent material weights individually for each projection among a set of multiple projections; and pixel-dependent material weights individually for each pixel among a set of multiple pixels; and combining the at least part of at least two material basis sinograms in the projection domain based on the at least one of the view-dependent material weights and the pixel-dependent material weights.

3. The method according to claim 2, wherein the step of determining at least one of the view-dependent material weights and the pixel-dependent material weights is performed based on at least one of a variance and a covariance between the at least part of at least two material basis sinograms.

4. The method according to claim 2, wherein the step of determining at least one of the view-dependent material weights and the pixel-dependent material weights comprises maximizing or minimizing a first objective function, with respect to at least one of noise, artifacts, delineation of anatomical features, pileup, ratio, signal-to-noise ratio (SNR) and contrast-to-noise ratio (CNR) of the reconstructed image.

5. The method according to claim 2, wherein the step of determining at least one of the view-dependent material weights and the pixel-dependent material weights comprises selecting a region of interest (ROI) and determining at least one of the view-dependent material weights and the pixel-dependent material weights in the ROI.

6. The method according to claim 1, wherein the step of performing the weighted combination of at least part of at least two material basis sinograms comprises iterative forward-projection comprising computing an estimated forward projection of the at least part of at least two material basis sinograms, wherein the weighted combination is based at least partly on the estimated forward projection.

7. The method according to claim 2, wherein at least one of the view dependent material weights and pixel-dependent material weights is at least one of:

constrained inside a predetermined reference interval based on a predetermined material weight, and parameterized as a function of a material or a signal level.

8. The method according to claim 2, wherein the step of determining at least one of the view-dependent material weights and the pixel-dependent material weights comprises maximizing or minimizing a second objective function with respect to material separation of a plurality of materials.

9. The method according to claim 1, further comprising at least one of filtering and downsampling at least a portion of at least one of:

the spectral X-ray data, and the at least part of at least two material basis sinograms to compensate for at least one of low-signal, photon starvation, and noise.

10. The method according to claim 1, further comprising bias-adjusting at least one of a first weighted material basis sinogram and a reconstructed image to generate a bias-adjusted reconstructed image, by at least one of:

performing Fourier domain splitting, in the projection domain of the first weighted sinogram and a weighted filtered sinogram and combining at least a portion of the Fourier domain split first weighted sinogram and at least a portion of the Fourier domain split weighted filtered sinogram to generate a bias-adjusted material sinogram, wherein the bias-adjusted sinogram is reconstructed into the bias-adjusted reconstructed image, and performing Fourier domain splitting in the image domain of a first reconstructed image reconstructed from a weighted sinogram and a second reconstructed image reconstructed from a weighted filtered sinogram and combining at least a portion of the Fourier domain split first reconstructed image and at least a portion of the Fourier domain split second reconstructed image to generate the bias-adjusted reconstructed image.

11. The method according to claim 2, wherein at least one of the view dependent material weights and the pixel-dependent material weights, and a predetermined material weight are parameterized as an objective function of at least one of: i) an estimated gradient in at least one of the view direction and the pixel direction of the projection; and ii) an estimated gradient of a reconstructed image, to compensate for bias.

12. The method according to claim 1, wherein the step of performing the weighted combination of the at least part of at least two material basis sinograms is performed by a machine learning system by mapping the at least part of at least two material basis sinograms into the reconstructed image.

13. The method according to claim 2, wherein the step of determining at least one of the view-dependent material weights and the pixel-dependent material weights is performed by a machine learning system.

14. The method according to claim 13, wherein the machine learning system comprises a trained convolutional neural network (CNN), wherein the step of determining at least one of the view-dependent material weights and the pixel-dependent material weights is performed by the CNN, wherein the CNN is trained for at least one of:

mapping the at least part of at least two material basis sinograms to the at least one of the view-dependent material weights and pixel-dependent material weights, and estimating at least one of a variance and a covariance based on a mapping between the at least part of at least two material basis sinograms and an objective function.

15. The method according to claim 12, wherein the machine learning system comprises a trained convolutional neural network (CNN), wherein the step of performing the weighted combination of the at least two material basis sinograms is performed by the CNN, being trained on at least sinograms obtained from at least one of simulated images, phantom images, and patient images.

16. The method according to claim 1, wherein the step of performing the weighted combination of at least two material basis sinograms comprises determining a matrix of material weights comprising at least a first material weight and a second material weight individually for each at least one of a projection and pixel, wherein the second material weight is orthogonal to the first material weight.

17. A computed tomography (CT) imaging system comprising:

an X-ray source configured to emit X-rays;

an X-ray detector configured to generate spectral X-ray data;

a processor configured to:

perform projection based material decomposition on the spectral X-ray data to generate a set of material basis sinograms; and perform a weighted combination of at least part of at least two material basis sinograms of the set of material basis sinograms into a reconstructed image based on material weighting in the projection domain.

18. The CT imaging system according to claim 17, wherein the processor is configured to:

determine at least one of:

individual view-dependent material weights for each projection among a set of multiple projections; and individual pixel-dependent material weights for each pixel among a set of multiple pixels, and combine the at least part of at least two material basis sinograms in the projection domain based on the at least one of the view-dependent material weights and the pixel-dependent material weights.

19. The CT imaging system according to claim 18, wherein the processor is configured to determine at least one of the view-dependent material weights and the pixel-dependent material weights based on at least one of a variance and a covariance between the at least part of the at least two material basis sinograms.

20. The CT imaging system according to claim 18, wherein the processor is configured to determine at least one of the view-dependent material weights and the pixel-dependent material weights based on maximizing or minimizing an objective function, with respect to at least one of noise, artifacts, delineation of anatomical features, pileup, ratio, signal-to-noise ratio (SNR) and contrast-to-noise ratio (CNR) of the reconstructed image.

21. The CT imaging system according to claim 17, wherein the processor comprises a machine learning system configured to perform the weighted combination of the at least part of at least two material basis sinograms by mapping the at least part of at least two material basis sinograms into the reconstructed image.

* * * * *